United States Patent
Liu et al.

(10) Patent No.: US 7,364,468 B2
(45) Date of Patent: Apr. 29, 2008

(54) DUAL-INTERFACE CONVERTER OF MINIATURE MEMORY CARD

(75) Inventors: Ming-Hui Liu, Yonghe (TW); Li-Ho Yao, Taipei (TW); Chien-Hung Chen, Taipei (TW); Chih-Yih Yao, Taipei (TW)

(73) Assignee: Stone Technology International Co., Ltd., Taipei (TW)

( * ) Notice: Subject to any disclaimer, the term of this patent is extended or adjusted under 35 U.S.C. 154(b) by 18 days.

(21) Appl. No.: 11/434,170

(22) Filed: May 16, 2006

(65) Prior Publication Data

US 2007/0270038 A1    Nov. 22, 2007

(51) Int. Cl.
*H01R 25/00*    (2006.01)
(52) U.S. Cl. .................................................. 439/638
(58) Field of Classification Search ................ 439/630, 439/638, 260, 945; 361/737; 235/441, 435, 235/439; 710/13, 301–303
See application file for complete search history.

(56) References Cited

U.S. PATENT DOCUMENTS

| | | | |
|---|---|---|---|
| 6,438,638 B1* | 8/2002 | Jones et al. | 710/301 |
| 6,612,492 B1* | 9/2003 | Yen | 235/451 |
| 6,773,291 B1 | 8/2004 | Roth et al. | |
| 2003/0038177 A1* | 2/2003 | Morrow | 235/441 |
| 2003/0041203 A1* | 2/2003 | Jones et al. | 710/301 |
| 2004/0050934 A1* | 3/2004 | Chen et al. | 235/441 |
| 2004/0089717 A1 | 5/2004 | Harari et al. | |
| 2005/0182872 A1 | 8/2005 | Shih | |
| 2005/0225950 A1* | 10/2005 | Matsuda et al. | 361/737 |

FOREIGN PATENT DOCUMENTS

| | | |
|---|---|---|
| CN | 2548293 Y | 4/2003 |
| CN | 1521756 A | 8/2004 |
| CN | 2672763 Y | 1/2005 |
| CN | 2689400 Y | 3/2005 |
| DE | 296 07 724 U1 | 7/1996 |
| EP | 1 146 428 | 10/2001 |
| WO | WO 02/05102 | 1/2002 |

* cited by examiner

*Primary Examiner*—Chandrika Prasad
(74) *Attorney, Agent, or Firm*—Bacon & Thomas, PLLC

(57) ABSTRACT

A dual-interface converter of a miniature memory card has a cartridge compatible with a standard memory card, a memory card interface together with a product interface formed on the cartridge, and a slot defined in the cartridge so that the miniature card is inserted to the cartridge through the slot. In one aspect of using the converter, a card reader is able to read or write data in the miniature memory card through the memory card interface. In another aspect, an electronic device is able to access data of the miniature memory card by connecting the product interface to a corresponding communication port of the electronic device. Further, the converter can serve as a portable storage media by incorporating a memory module.

23 Claims, 33 Drawing Sheets

FIG.4H

DUAL-INTERFACE CONVERTER OF MINIATURE MEMORY CARD

BACKGROUND OF THE INVENTION

1. Field of the Invention

The present invention relates to a dual-interface converter of a miniature memory card, and more particularly to a dual-interface converter that can be used as a wireless or wired interface to adapt a miniature memory card to a standard memory card.

2. Description of Related Art

As digital technology age comes, portable electronic products have been digitalized as the multi-function devices to meet consumers' requirements. For example, cell phones can be used to take pictures and play MP3 files, and digital cameras have dynamic video recording function. The most common storage media for these electronic devices are memory cards. Many well-known companies have designed and popularized different types of memory cards for most kinds of electronic devices. To this day, the miniature memory card for cell phone or digital camera is able to store a large quantity of data. The size of the early SD memory card and MMC memory card is like a stamp. However, the present miniature memory card (MMC MICRO) developed by Samsung, a South Korea electronic company, has a smaller size (12 mm×14 mm×1.1 mm) than early standard memory card.

Transmitting data in the miniature memory card to a computer may experience some difficulties even though the memory card can be easily installed in the electronic devices. For example, most of combo card readers, which can be built in or externally connected to the computer, do not support the miniature memory cards. Therefore, the miniature memory card is often sold accompanying with a converting cartridge.

With reference to FIGS. 15 and 16, the conventional converting cartridge (70) for the miniature memory card (80) is sized as a standard MMC memory card. The converting cartridge (70) has a slot (71) where the miniature memory card (80) is inserted and has a MMC interface (72) that can electronically and correspondingly connect to the miniature memory card (80). Because the standard MMC card differs from the miniature memory card (80) only in their sizes, the simple modification to the structures can allow a MMC card-compatible card reader to read or write the miniature memory card (80).

However, for most of the personal computer users, the combo memory card reader is not a popularized fundamental device. Even though the miniature memory card (80) is sold with the converting cartridge (70), computer users who have no card reader are unable to utilize the card (80).

Therefore, the invention provides a novel dual-interface converter of a memory card to mitigate or obviate the aforementioned problem.

SUMMARY OF THE INVENTION

The main objective of the present invention is to provide a dual-interface converter for a miniature memory card, wherein the converter uses either a memory card interface or a product interface to connect to a card reader or an electronic device. The card reader or the electronic device can read or write data of the miniature memory card.

To achieve the main objective, the converter comprises a cartridge and a converter module mounted in the cartridge. The cartridge is compatible with a standard memory card and forms a slot, a product interface and a memory card interface. The converting module in the cartridge is connected among the memory card interface, the product interface and the slot.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
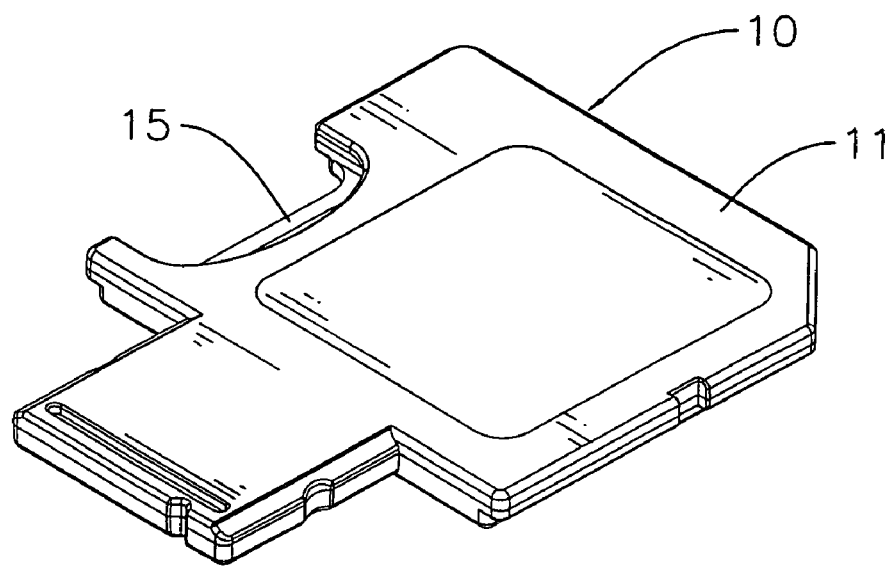
FIG. 1 is a top perspective view of a first embodiment of a dual-interface converter in accordance with the present invention.
Figure 2:
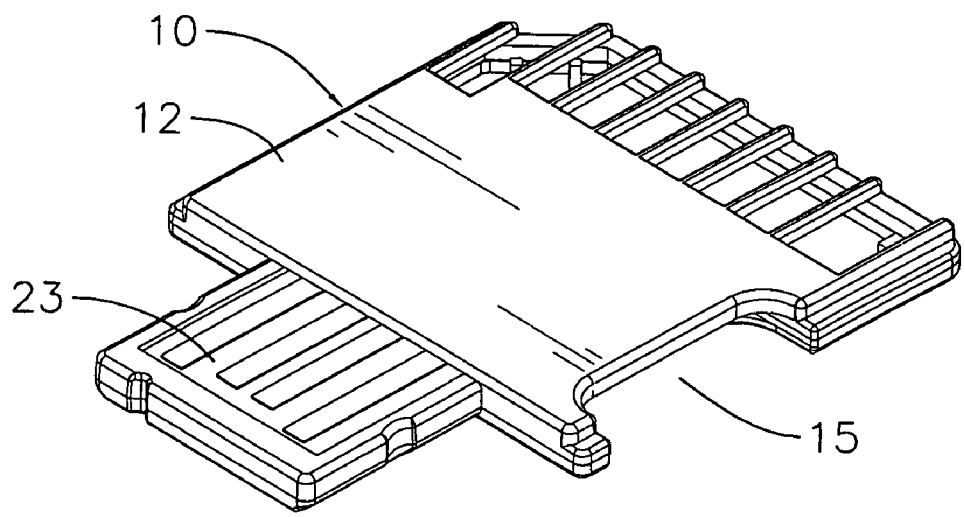
FIG. 2 is a bottom perspective view of the dual-interface converter of FIG.

With reference to FIGS. 1 and 2, a dual-interface converter of the present invention has a cartridge appearance similar to a standard memory card. The cartridge has a housing (10) to hold a miniature memory card (80) and uses either a standard memory card interface or a product interface to transmit data between the miniature memory card (80) and a target electronic device (not shown). The product interface can be either a wired communicating protocol such as USB and IEEE 1394 standards, or a wireless communication standard including, for example, RFID (Radio Frequency IDentification), Bluetooth, wireless LAN or wireless USB. The USB interface of the wired communication standard is used as an example in the following description.

Figure 3:
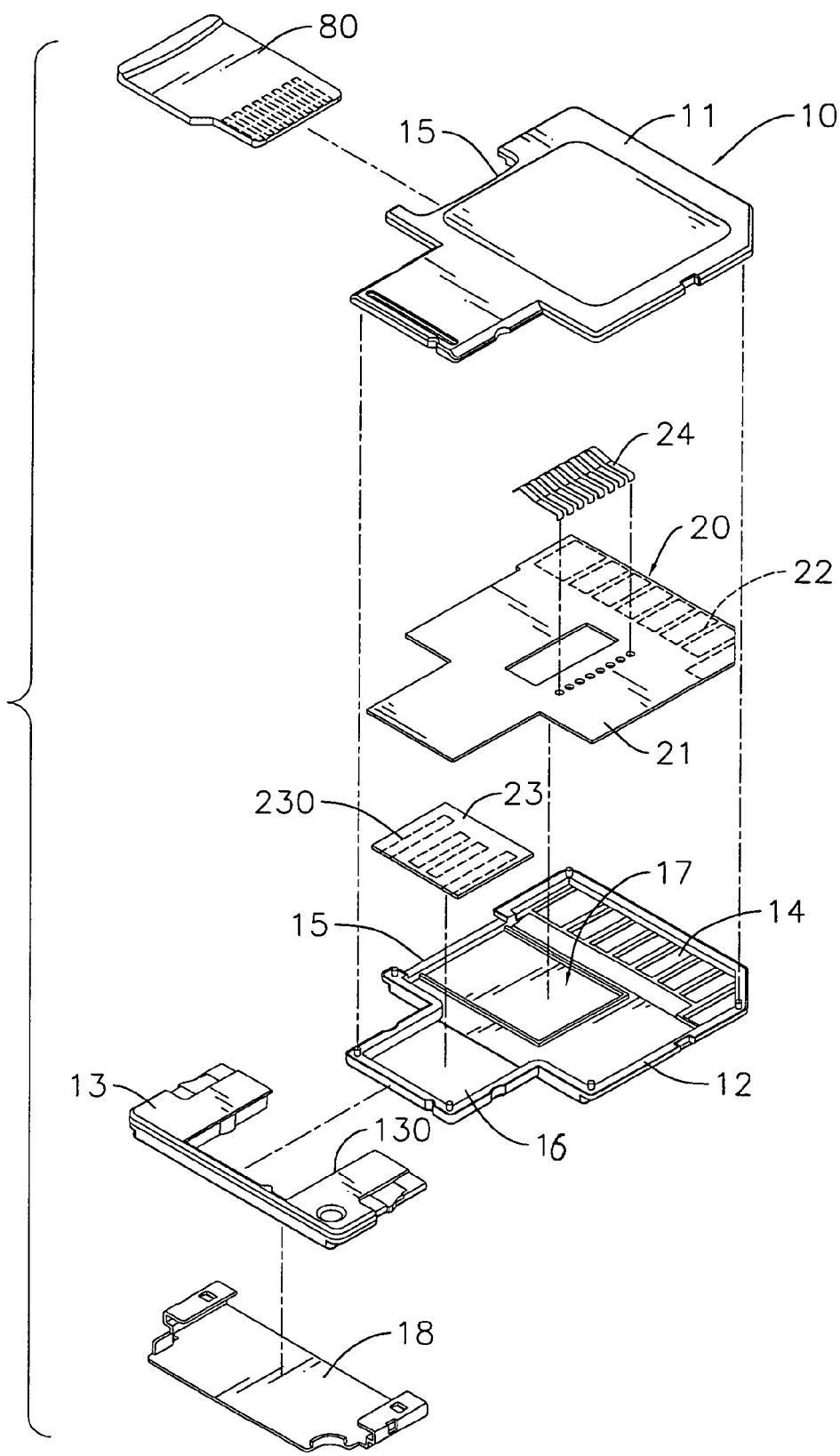
FIG. 3 is an exploded perspective view of the dual-interface converter of FIG. 1.
Figure 4A:
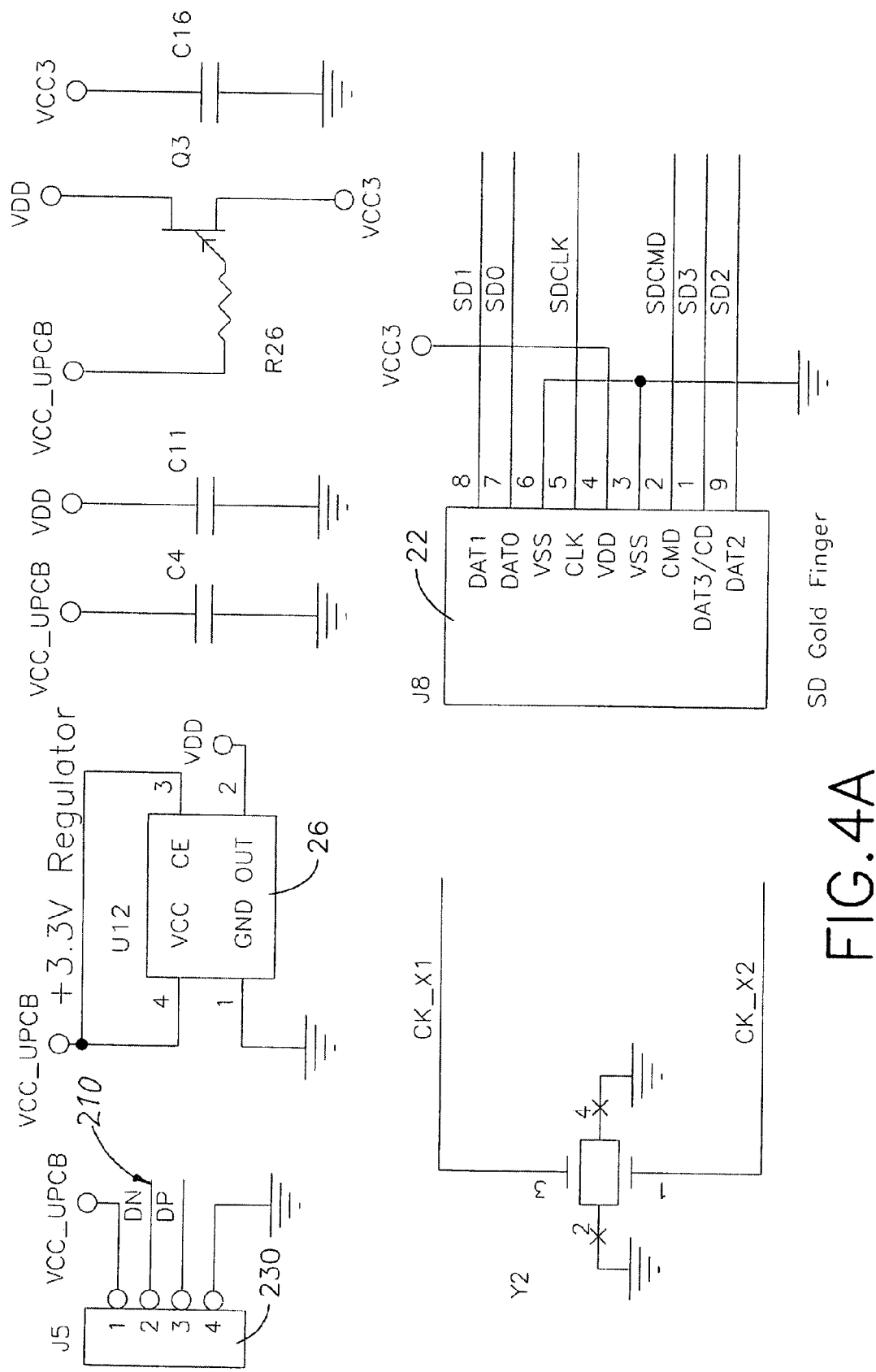
FIG. 4 is a circuit diagram of a converting module of the dual-interface converter in accordance with the present invention.
Figure 4B:
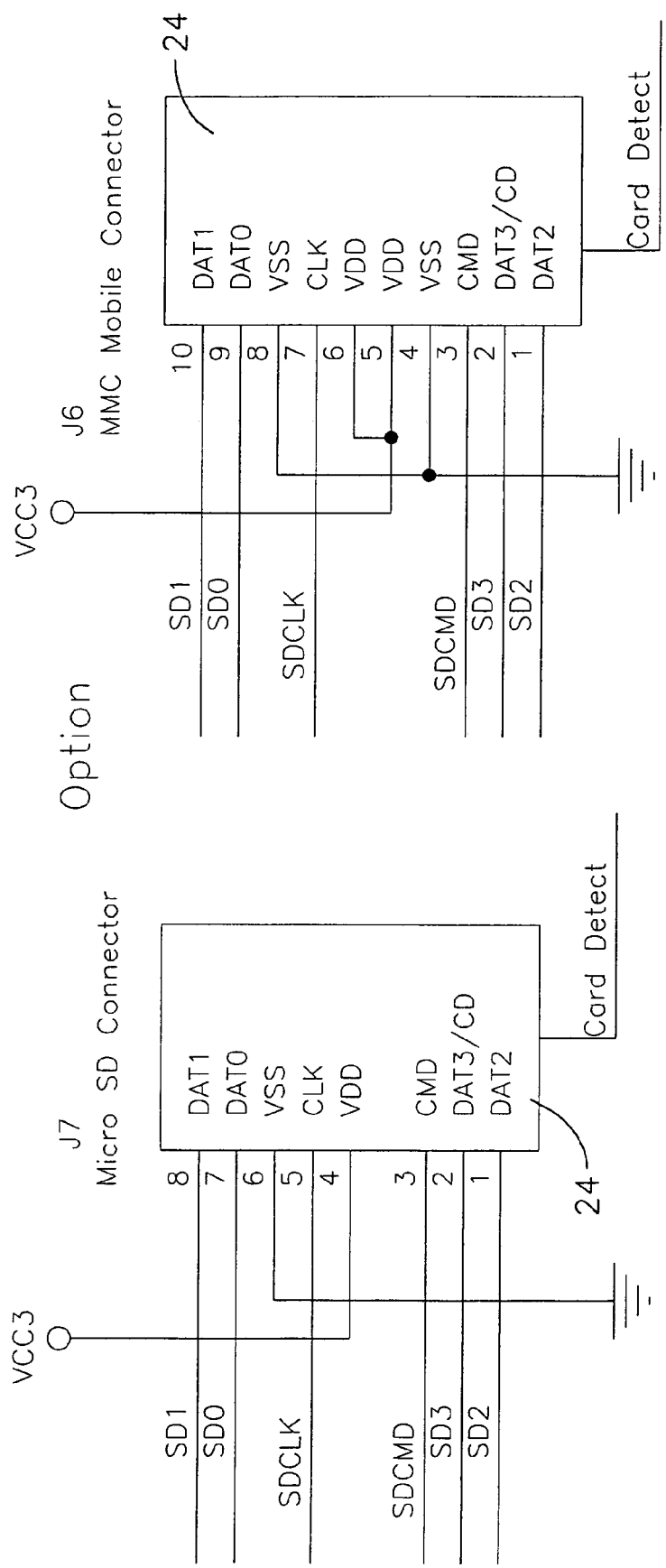
Figure 4C:
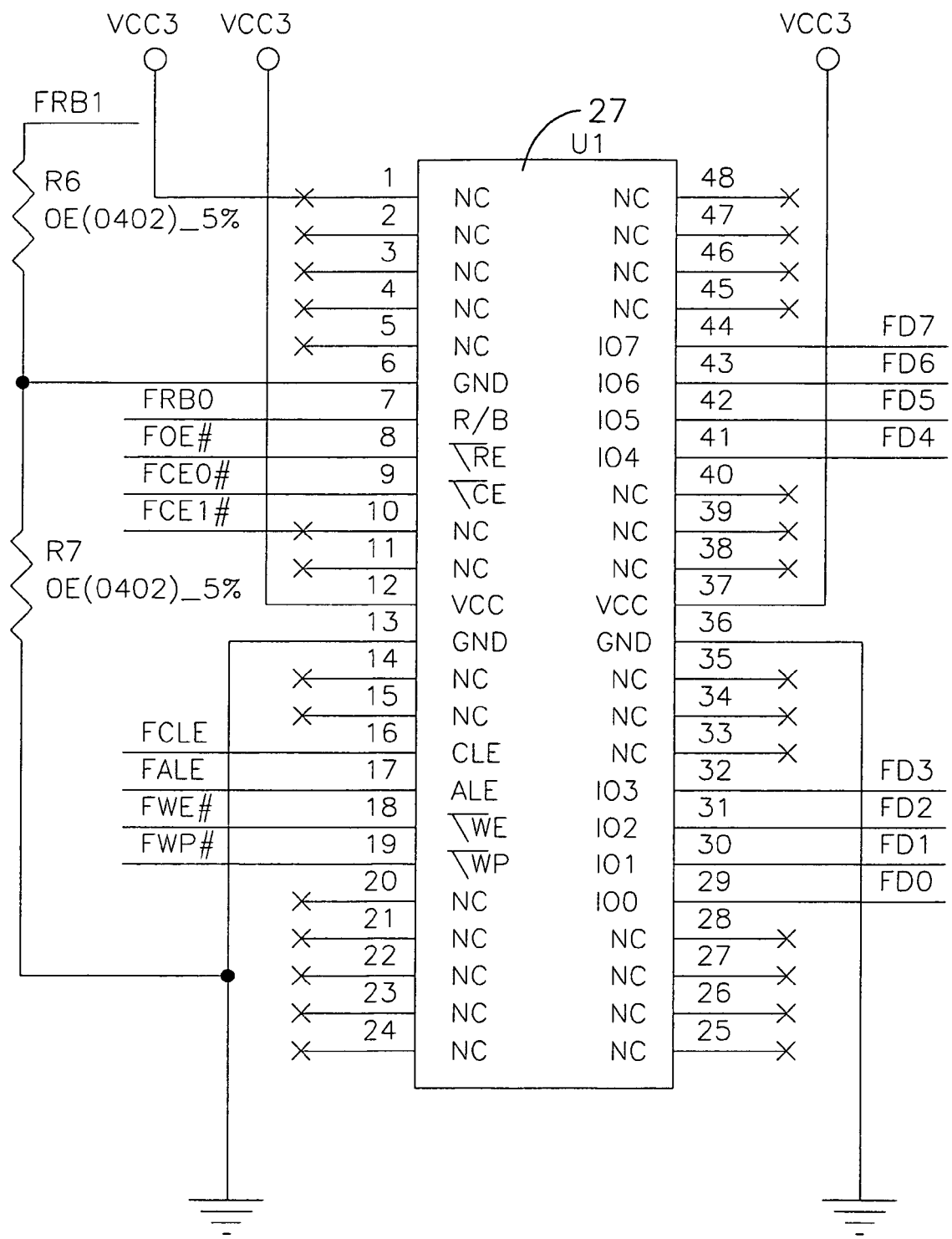
Figure 4D:
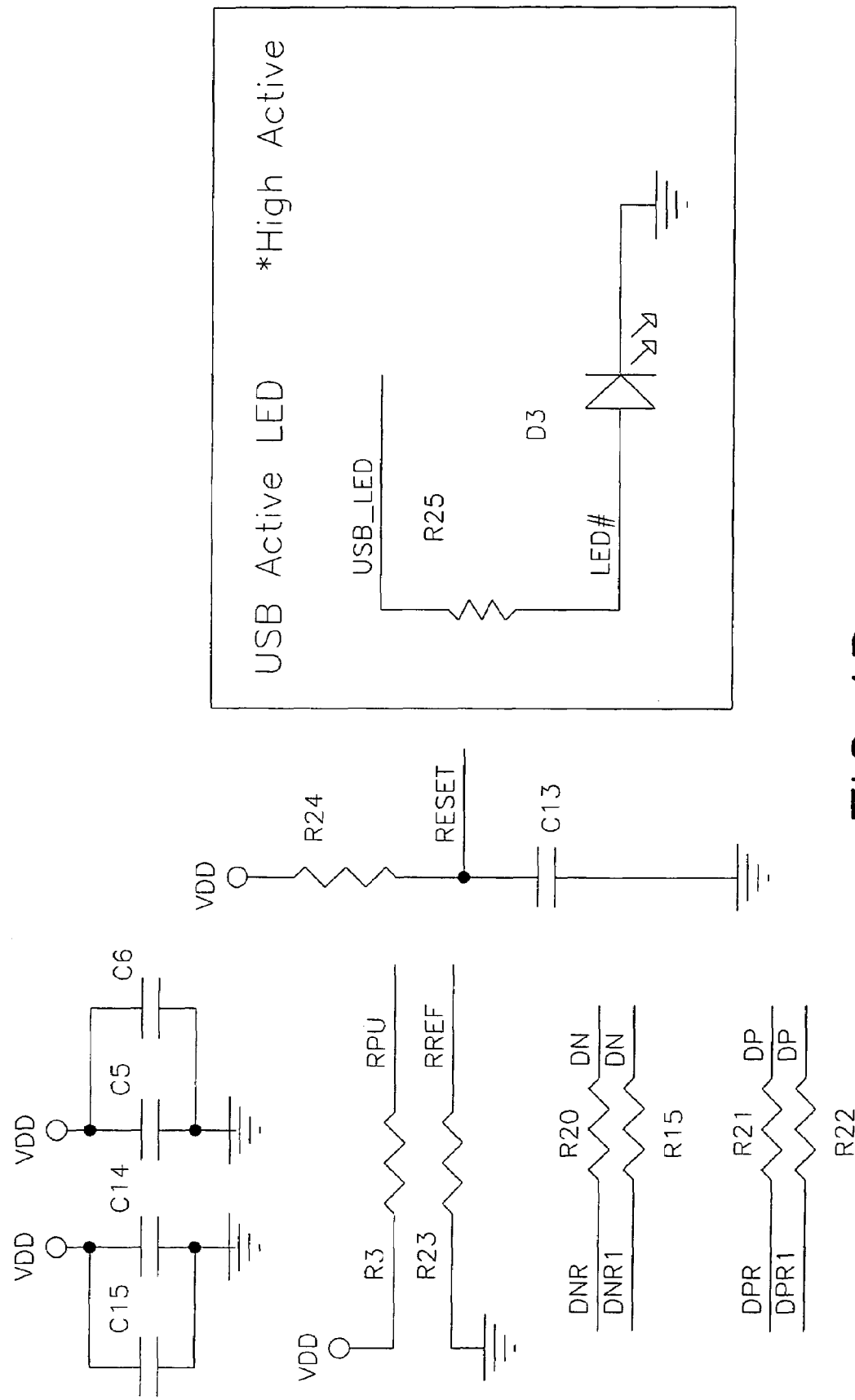
Figure 4E:
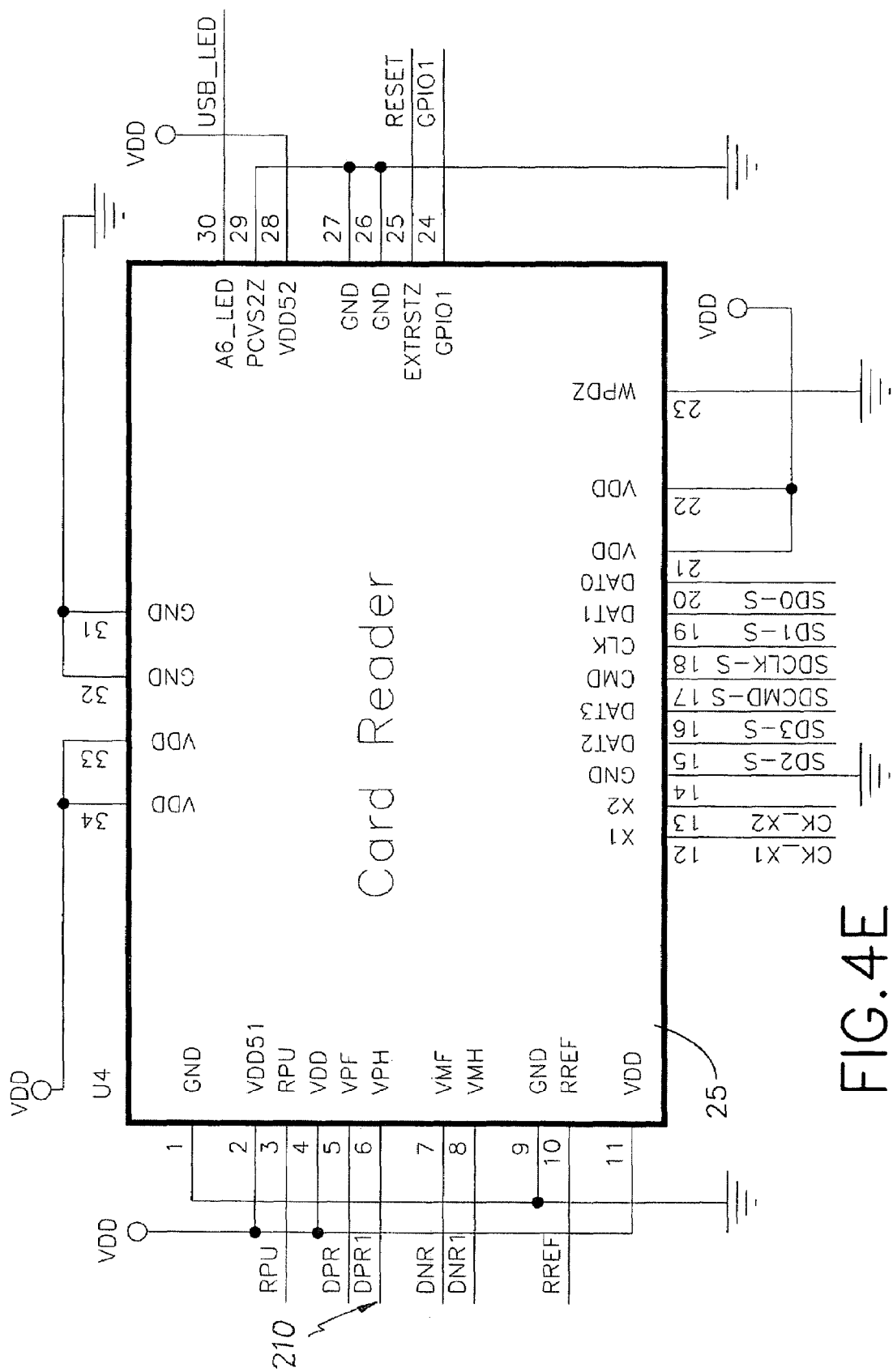
Figure 4F:
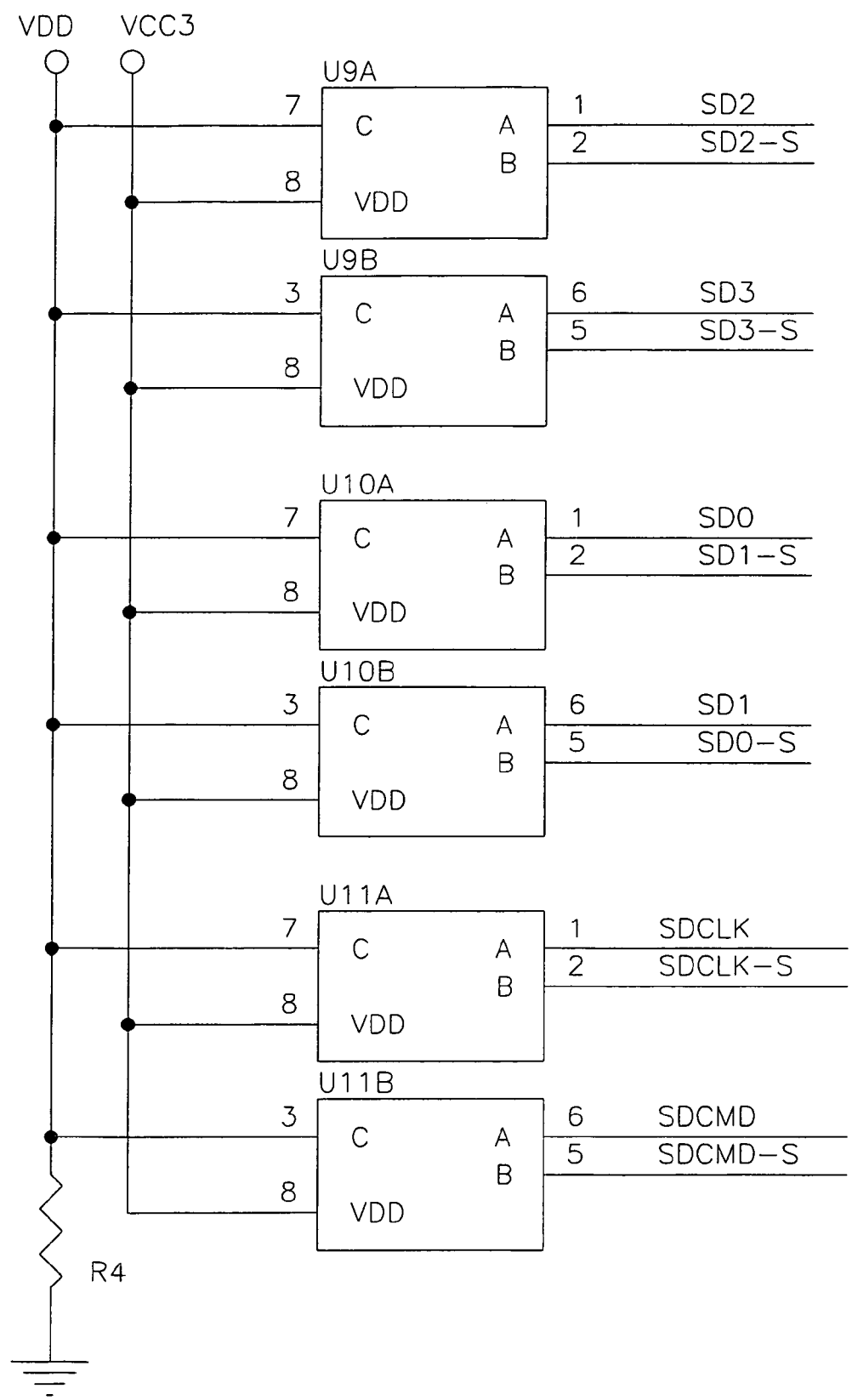
Figure 4G:
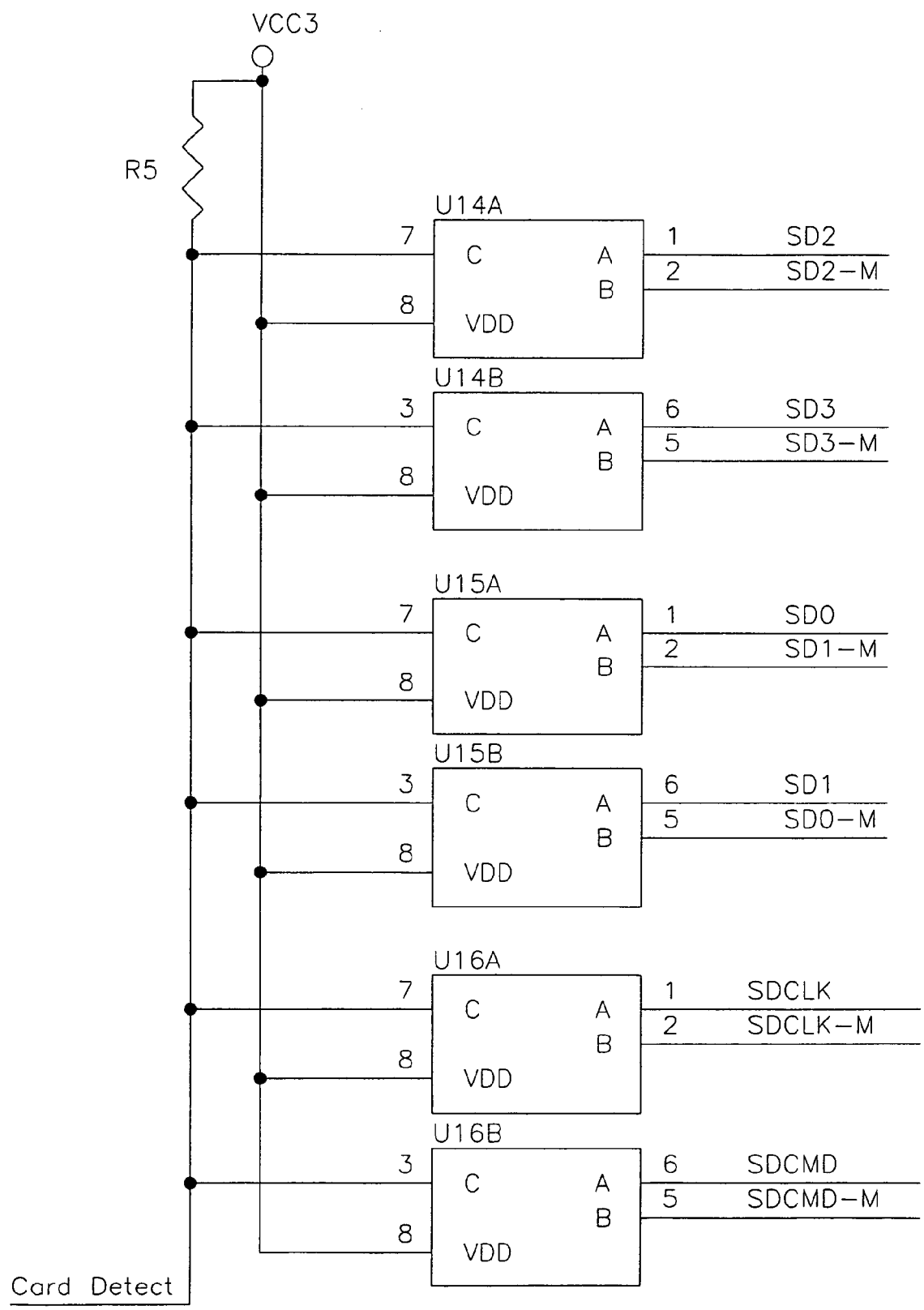

With reference to FIG. 3, in addition to the housing (10), the cartridge comprises a converting module (20) mounted in the housing (10). The housing (10) is formed by a top shell (11) and a bottom shell (12) correspondingly assembled together. Both the top shell (11) and the bottom shell (12) have an interface side (not numbered). The top shell (11) further forms a platform (not numbered) that extends outward from an opposite edge of the interface side. The bottom shell (12) has a U-shaped frame (16) corresponding to the platform. When the two shells (11, 12) are assembly together, the platform and the U-shaped frame (16) form a protruding. Multiple through holes (14) are defined on the bottom shell (12) along the interface side. Moreover, a notch (15) is defined at one edge of the top shell (11) and the bottom shell (12). The two notches (15) form a slot (17) when the two shells (11, 12) are correspondingly assembled together. Thus, the miniature memory card (80) can be inserted into the housing (10) through the slot (17).

The converting module (20) in the housing (10) comprises a main circuit board (21) and an auxiliary circuit board (23). The main circuit board (21) forms connecting wires (210) and a card-reading control circuit (25), and both will be discussed later accompanying with FIG. 4.

The main circuit board (21) is shaped to correspond to the shells (11, 12) and includes a top surface and a bottom surface. Multiple contacts (22) as the memory card interface are formed on the bottom surface of the main circuit board (21) and respectively corresponding to the through holes (14) of the bottom shell (12). The memory card interface can be, but not limited to, the SD, MMC, MS or MS DUO memory card interface.

The auxiliary circuit board (23) is connected to the bottom surface of the main circuit board (21) and has multiple signal contacts (230) at the bottom surface as the USB product interface to connect to a USB port of a target electronic device. The signal contacts (230) electronically connect to the card-reading control circuit through the connecting wires (210). When the main circuit board (21) together with the auxiliary circuit board (23) are held between shells (11, 12), the auxiliary circuit board (23) is surrounded by the frame (16).

The main circuit board (21) further has a connector (24) to connect the miniature memory card (80). The connector (24) in this embodiment is formed by multiple terminals mounted on the main circuit board (21).

With reference to FIG. 4, the control circuit (25) of the converting module (20) has four terminals VPF, VPH, VMF and VMH connecting to the signal contacts (230) of the product interface and uses terminals DAT0 to DAT3, CLK and CMD connecting to the connector (24) through a first switch bus. The first switch bus is composed of multiple switching modules (U9A-U11A and U9B-U11B). The connector (24) is compatible with Micro SD, MMC Micro or MS Micro(M2) standards. The multiple contacts (22) as the memory card interface are correspondingly connected to the terminals of the connector (24) through the adapting circuit on the main circuit board (21). The operations of the switching modules (U9A to U11A and U9B to U11B) and the card-reading control circuit (25) are depended on whether the USB interface of the cartridge is connected to a USB port of the electronic device. When the signal contacts (230) connect to the USB port of the electronic device, a DC voltage VCC_UPCB from the electronic device is transmitted to and processed by a voltage regulator (26) of the converting module (20). The voltage regulator (26) outputs a first operating voltage VDD to the card-reading control circuit (25) and all switching modules (U9A to U11A and U9B to U11B). The operating voltage VDD passing through an electronic switch (Q3) is defined as a second operating voltage VCC3. The second operating voltage VCC3 is also output to all switching modules (U9A to U11A and U9B to U11B). The first operating voltage VDD controls whether the switching module should be conducted. The second operating voltage VCC3 is used as an operating voltage for each switching module (U9A to U11A and U9B to U11B). The miniature memory card (80) can connect to the card-reading control circuit (25) through the conducted switching modules (U9A to U11A and U9B to U11B). Since the card-reading control circuit (25) is connected to the USB port of the electronic device, the electronic product is able to access the miniature memory card (80) through the card-reading control circuit (25).

Figure 5:
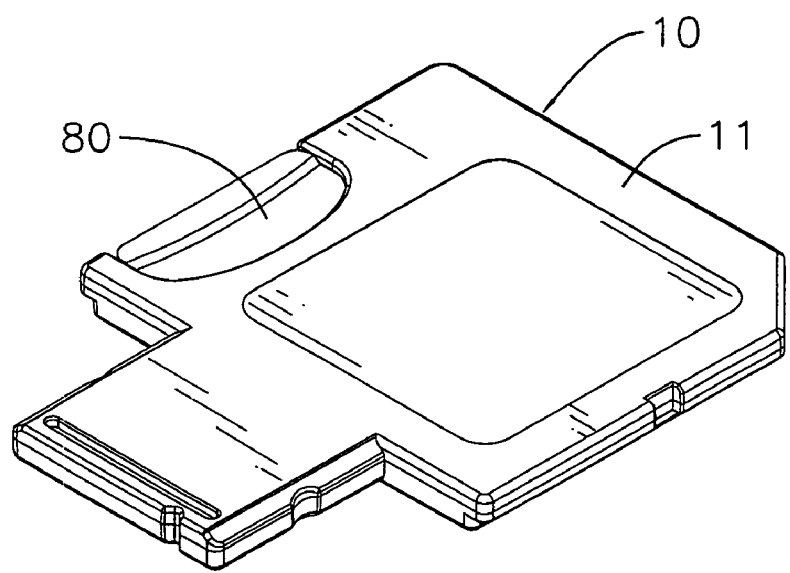
FIG. 5 is a top perspective view of the dual-interface converter of FIG. 1 holding a miniature memory card.
Figure 6:
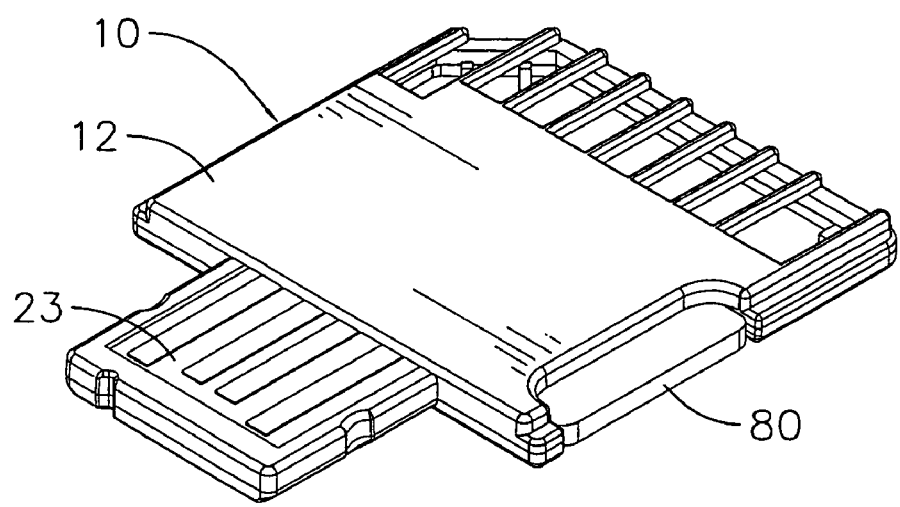
FIG. 6 is a bottom perspective view of the dual-interface converter of the present invention assembled with the miniature memory card.

With reference to FIGS. 5 and 6, if the miniature memory card (80) has been inserted to the cartridge, the converter can connect to the USB port by the product interface. The memory card interface and the product interface in the foregoing embodiment are formed on the same surface of the cartridge. However both of the interfaces can be respectively formed on opposite surfaces.

Figure 7:
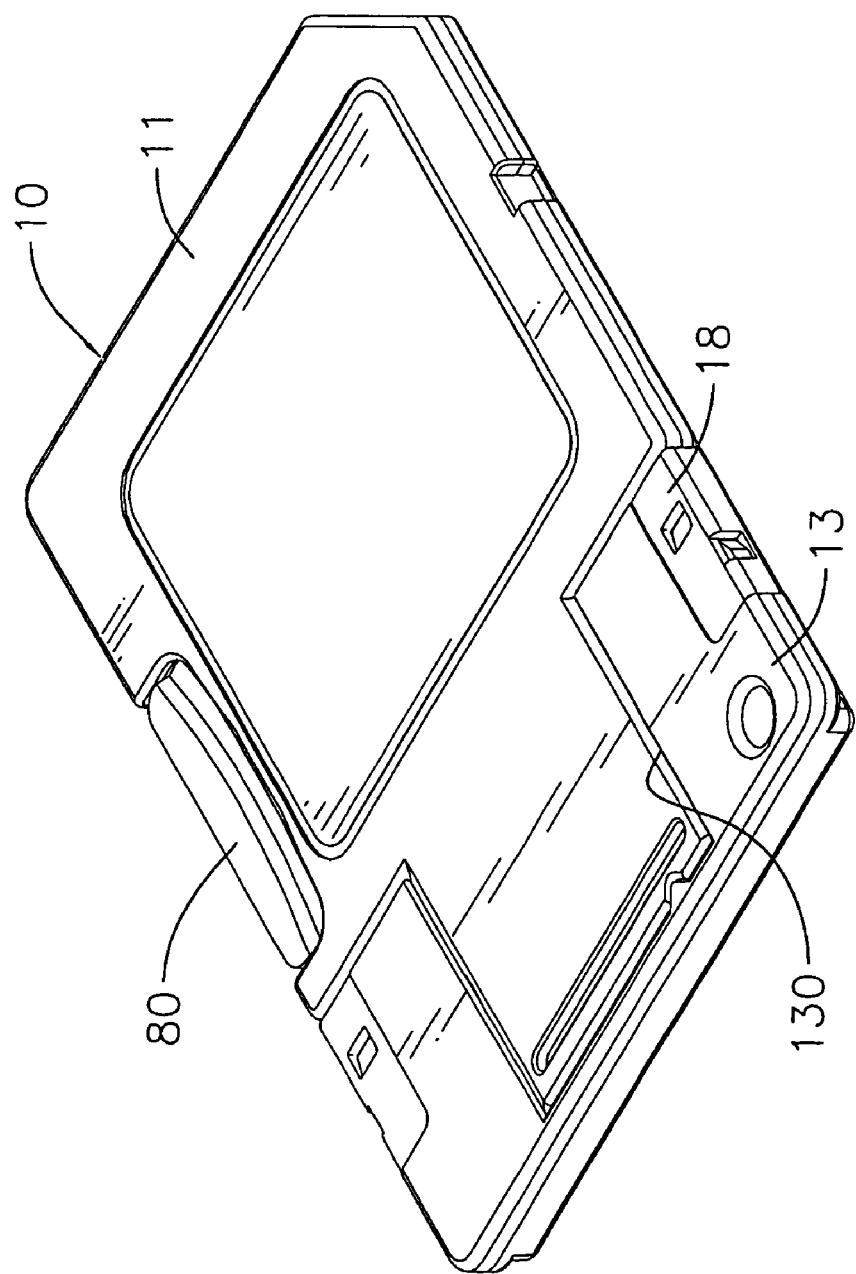
FIG. 7 is a perspective view of the dual-interface converter of FIG. 1 compensated by a protect cover.

With reference to FIG. 7, however an optional U-shaped protect cover (13) can be used to compensate the cartridge to form a substantially rectangular converter by mounting the optional protect cover (13) to the protruding. The compensated cartridge has the same appearance as a standard memory card. In addition to the compensating, the protect cover (13) can prevent the protruding from snapping. However, without the compensation of the protect cover (13), the cartridge still can be easily inserted to the memory card reader.

With reference to FIGS. 3 and 7, the protect cover (13) is formed by a U-shaped body with a groove (130). The protruding can slip into the protect cover (13) along the groove (130). In this embodiment a metal plate (18) is further mounted to one side of the U-shaped body.

The dual-interface converter in accordance with the present invention can be formed to different embodiments as described hereinafter. The size and shape of the housing (10) are the same as a standard memory card. The product interface in the following embodiments can be held in the housing (10).

Figure 8:
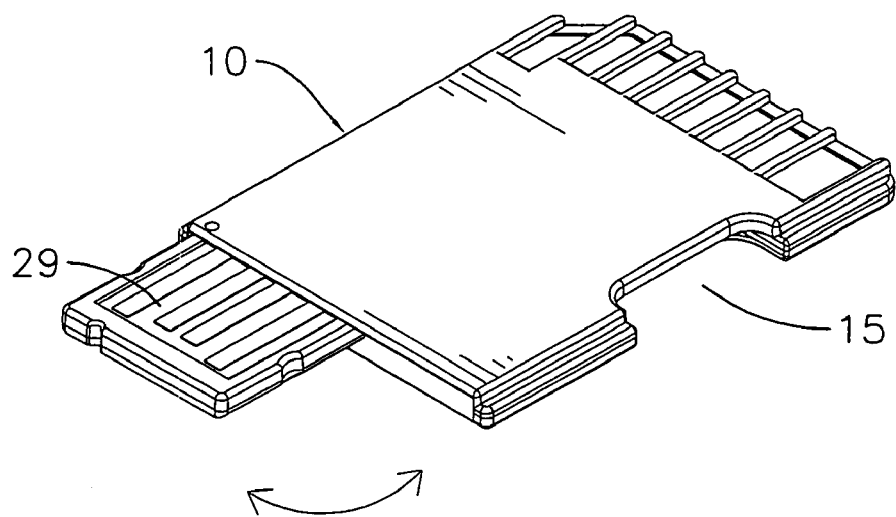
FIG. 8 is a perspective view of a second embodiment of a dual-interface converter in accordance with the present invention.

With reference to FIG. 8, the housing (10) has an opening (not numbered) defined at one side opposite to the memory card interface. The product interface (29) is pivotally mounted in the opening of the housing (10). When the product interface (29) is turned outward and protruding from the housing (10), the cartridge can connect to a compatible connector such as the USB port of the electronic device by the product interface (29). When the product interface (29) is received in the opening, the housing (10) has the shape of a standard memory card.

Figure 9:
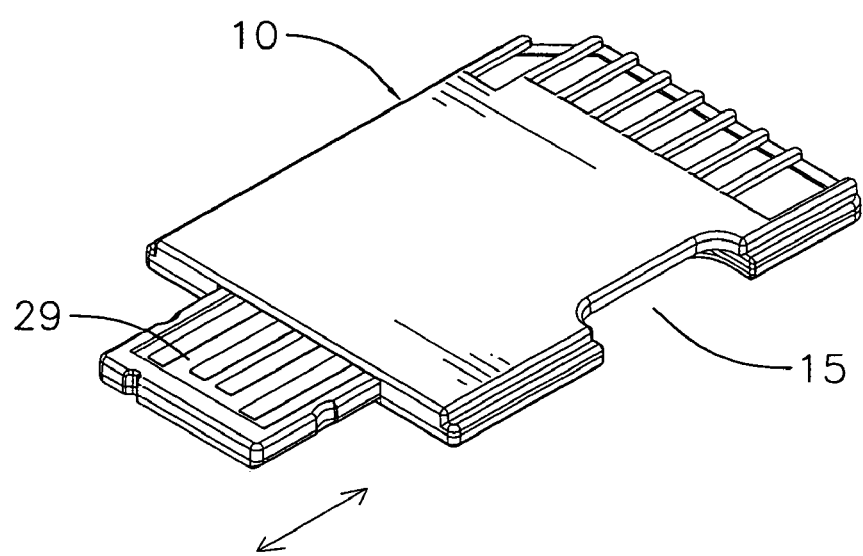
FIG. 9 is a perspective view of a third embodiment of a dual-interface converter in accordance with the present invention.

With reference to FIG. 9, the housing (10) has a space where the product interface (29) is movably held. The product interface (29) can be horizontally drew from or pushed into the housing (10) along the space. When the product interface (29) is drew from the housing (10), the cartridge can connect to a compatible connector of the electronic device by the product interface (29). After the product interface (29) is held in the space, the shape of the housing (10) is identical to a standard memory card.

Figure 10:
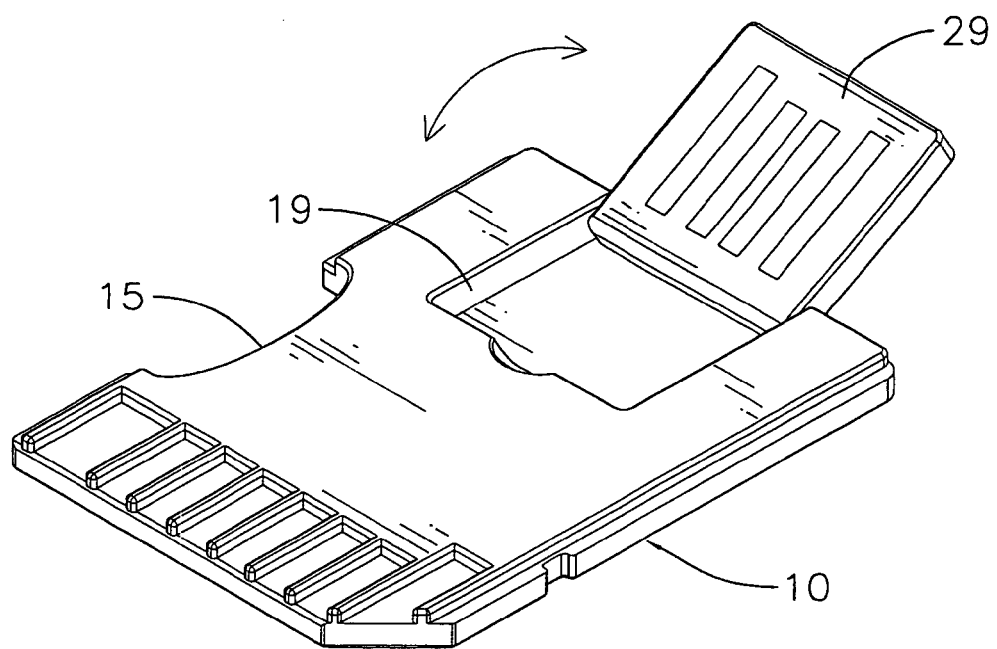
FIG. 10 is a perspective view of a fourth embodiment of a dual-interface converter in accordance with the present invention.

With reference to FIG. 10, the housing (10) is defined with a recess (19) to hold the product interface (29). The product interface (29) is pivotally mounted at opposite sides of the recess (19) as a foldable connector. When the product interface (29) is completely folded in the recess (19), the housing (10) has the appearance the same as the standard memory card suitable for directly inserting to a card reader. When the product interface (29) is lifted and protruding from the housing (10), the product interface (29) can connect to a compatible port of the electronic device.

In another embodiment the dual-interface converter in accordance with the present invention can serve as a portable storage media. To achieve the function, a memory module (27) and a memory card control circuit (28) are formed in the converter. Both of them are preferably formed in the converting module (20).

With reference to FIG. 4, the memory module (27) is connected to the memory card control circuit (28). The memory card control circuit (28) connects to the contacts (22) through a second switch bus and also connects to the card-reading control circuit (25) through the switching modules (U9A to U11A and U9B to U11B) of the first switch bus. The second switch bus is composed of multiple switching modules (U14A to U16A and U14B to U16B).

The operating voltage VCC3 for all switching modules (U9A to U11A U9B to U11B, U14A to U16A and U14B to U16B) is output from the electronic device when the converter connects to USB port of the electronic device. When the converter disconnects from the electronic device and turns to link to a compatible card reader by the memory card interface, the card reader can provide the operating voltage VCC3.

The operations of the switching modules (U14A to U16A and U14B to U16B) and the memory card control circuit (25) are depended on whether the connector (24) is connected to the miniature memory card (80). The connector (24) has a detecting pin (Card Detect) connecting to all control pins (C) of all switching modules (U14A to U16A and U14B to U16B). When the miniature memory card (80) connects to the connector (24), the converter only serves as a converting device and the detecting pin (Card Detect) will disable all switching modules (U14A to U16A and U14B to U16B). As a result, the memory module (27) and the memory card control circuit (28) have no connections to the card-reading control circuit (25) and the standard memory card interface.

If the miniature memory card (80) is not inserted in the converter, the converter can connect to either an electronic device or a card reader, with the standard memory card interface or the USB interface to. The memory card control circuit (28) accordingly connects to the contacts (22) or the card-reading control circuit (25) through the switching modules (U9A to U11A and U9B to U11B). Therefore, the converter is used as a portable data storage media for the electronic device, or further compensated to form a standard memory card (as shown in FIG. 7) to connect to the card reader or any electronic product.

With reference to FIG. 11, the circuit is similar to FIG. 4 but a wireless communicating interface is used to replace the original wired interface. As an example, the wireless communicating interface is a wireless USB interface. A card-reading control circuit (25') incorporated with a wireless interface controller replaces the original card-reading circuit (25). Signal input and output pins (Rfin, Rfout) of the card-reading control circuit (25') are connected to an antenna (252) through a RF matching circuit (251) to wirelessly transmit or receive data.

Figure 12:
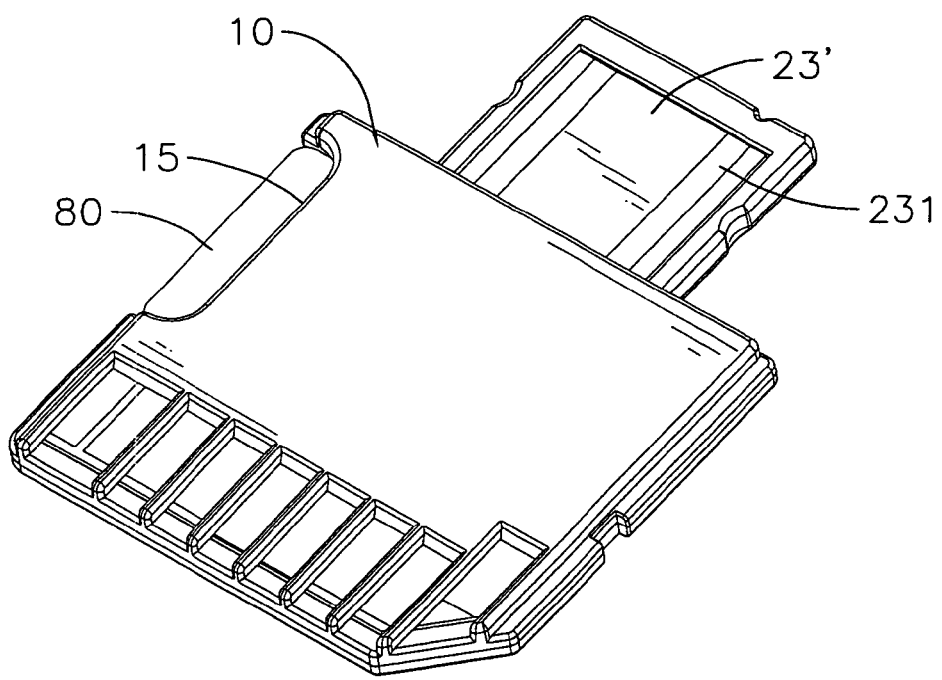
FIG. 12 is a perspective view of the dual-interface converter with a wireless USB interface of a first embodiment in accordance with the present invention.
Figure 11A:
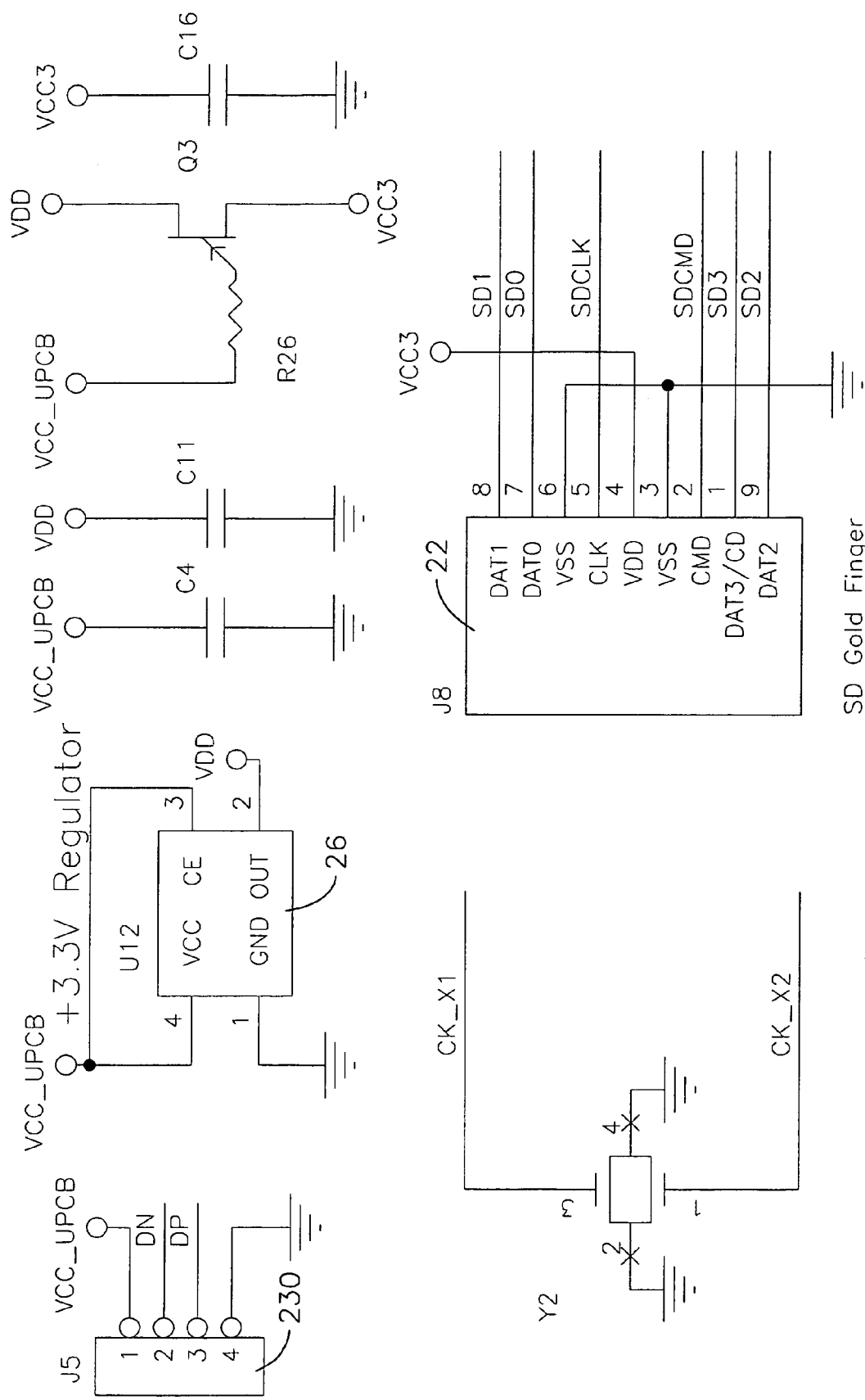
FIG. 11 is a circuit diagram of a dual-interface converter using a wireless USB interface in accordance with the present invention.
Figure 11B:
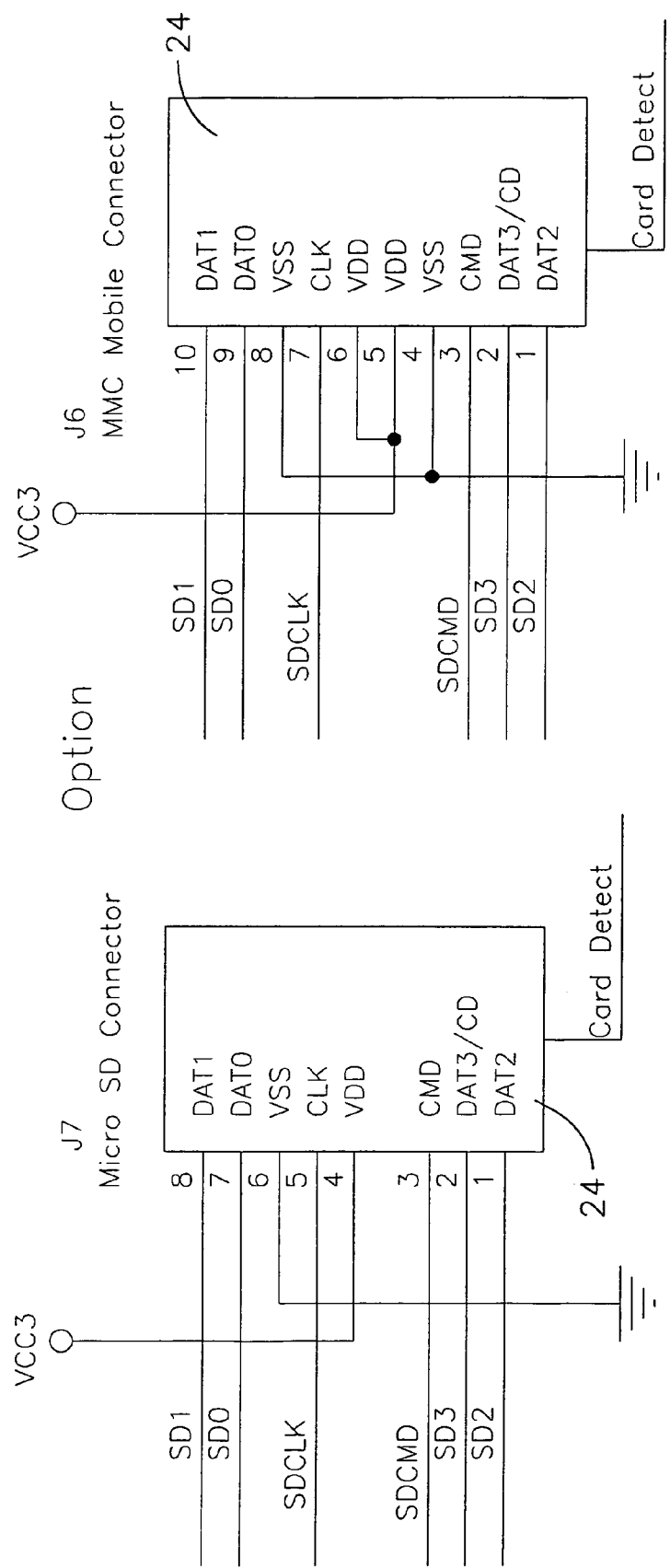
Figure 11C:
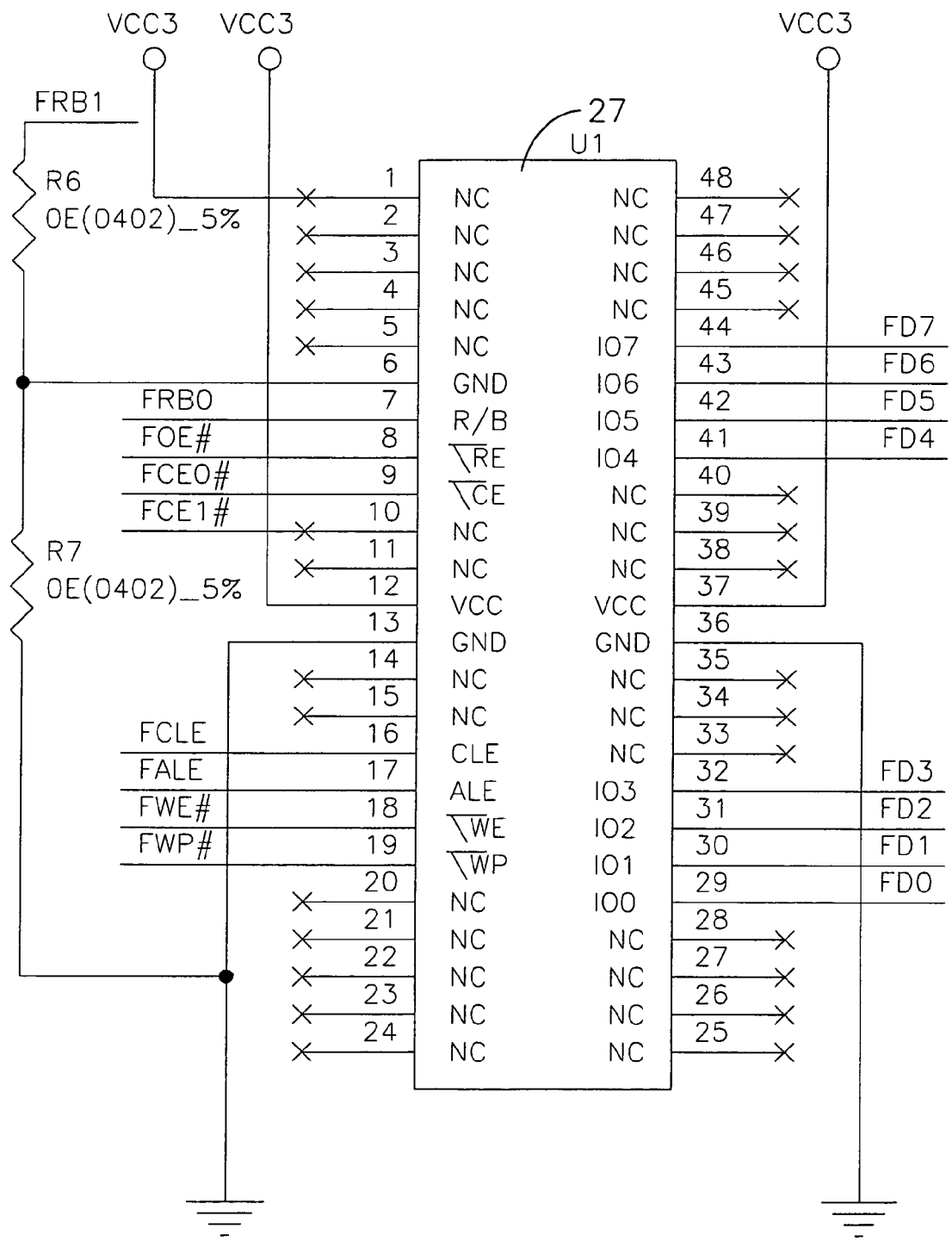
Figure 11D:
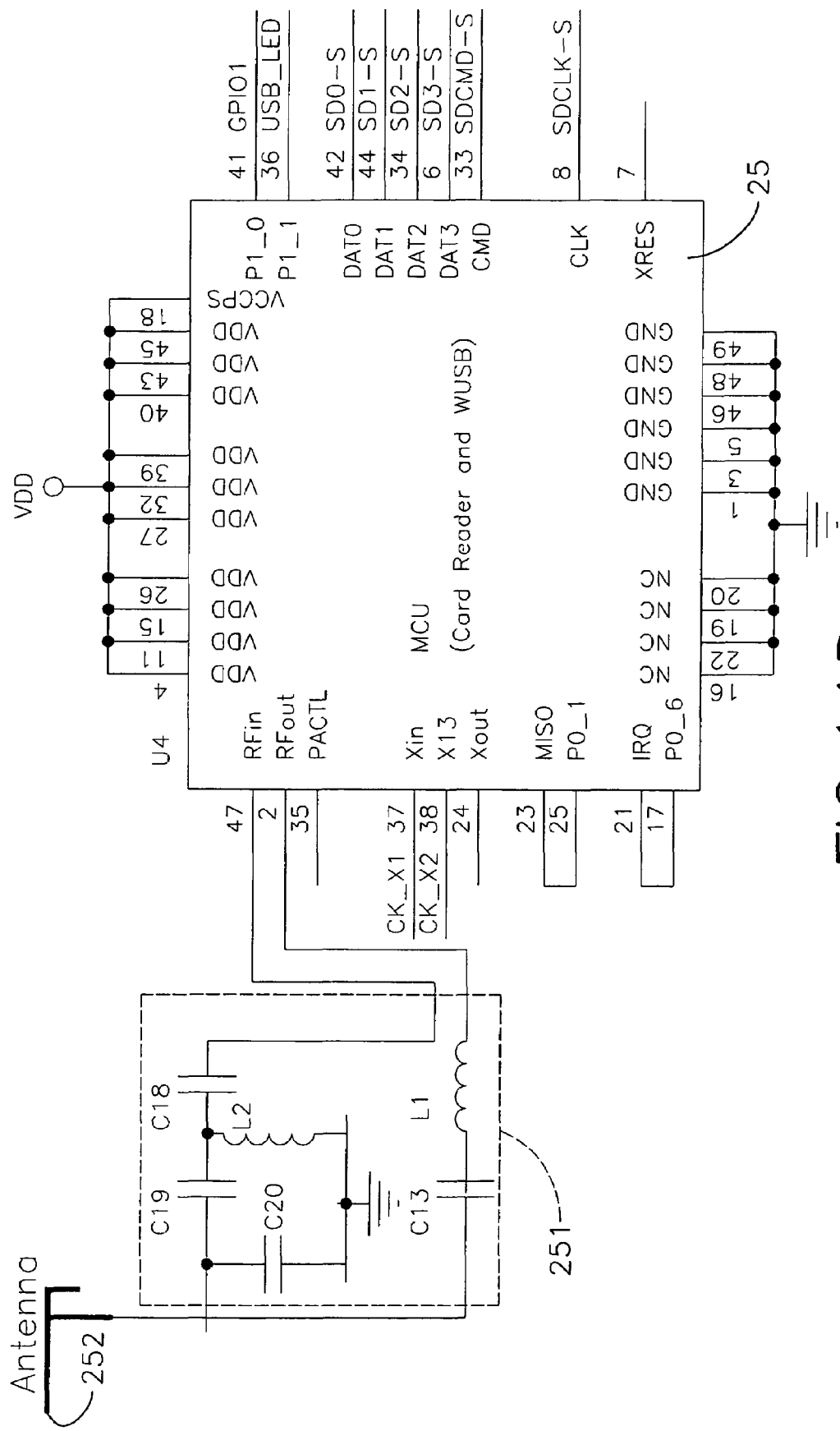
Figure 11E:
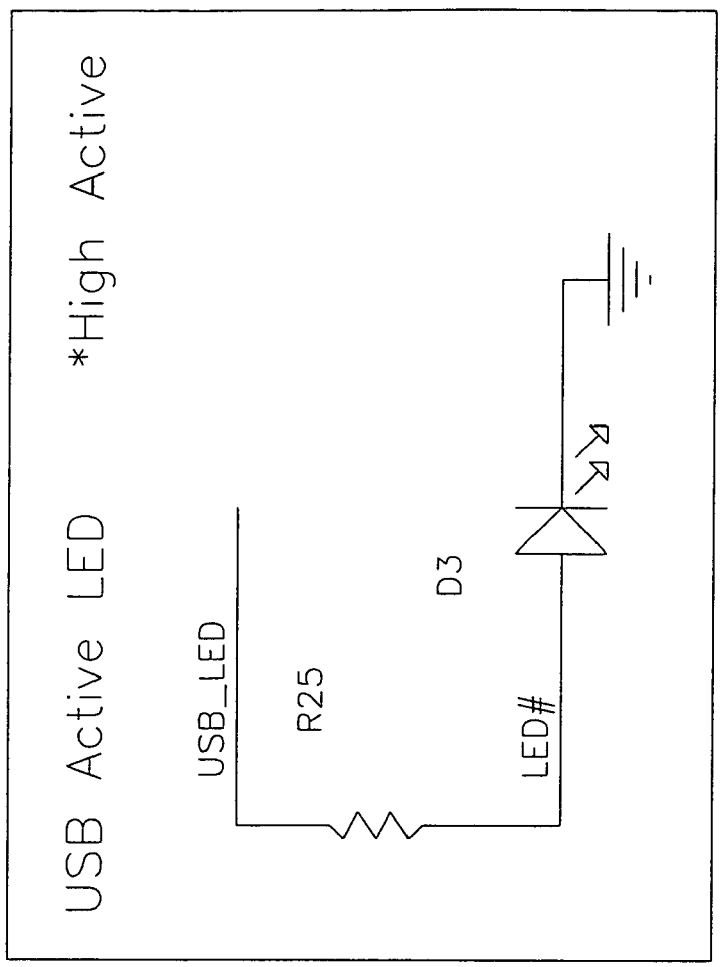
Figure 11E:
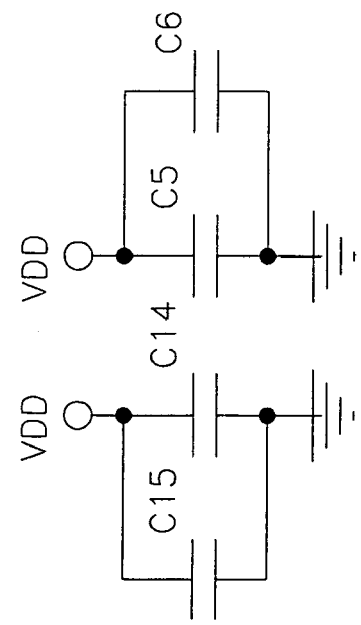
Figure 11F:
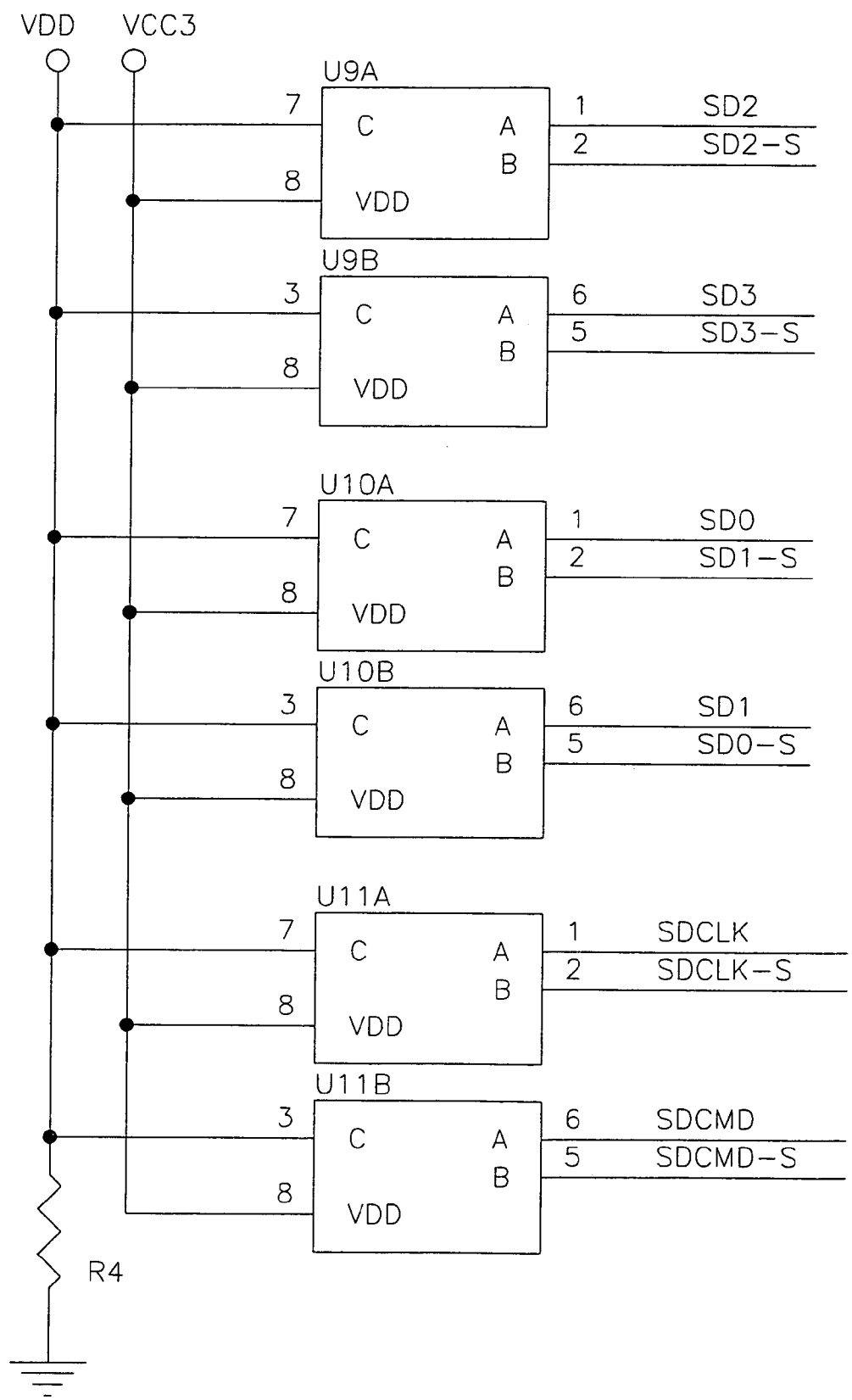
Figure 11G:
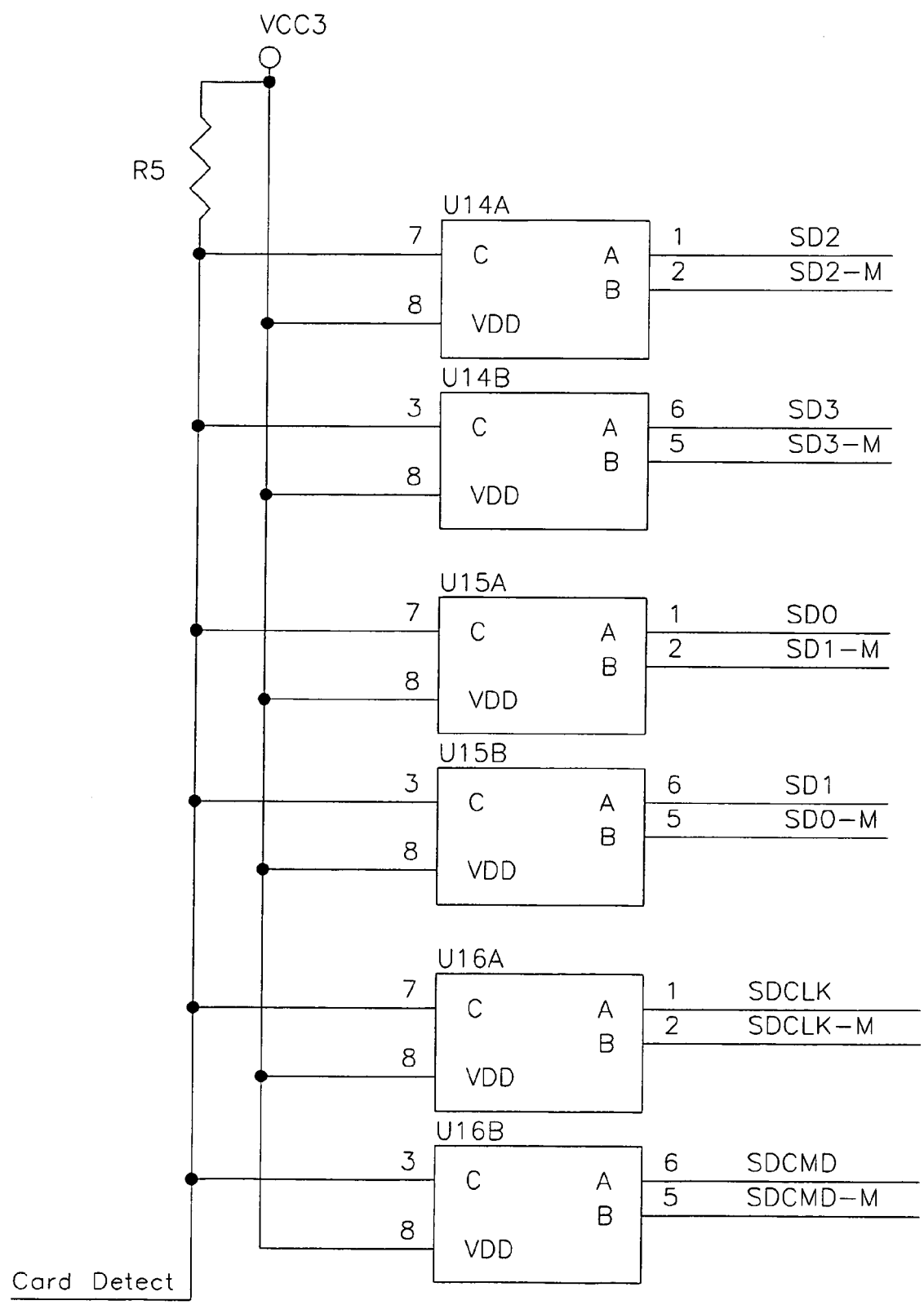
Figure 11H:
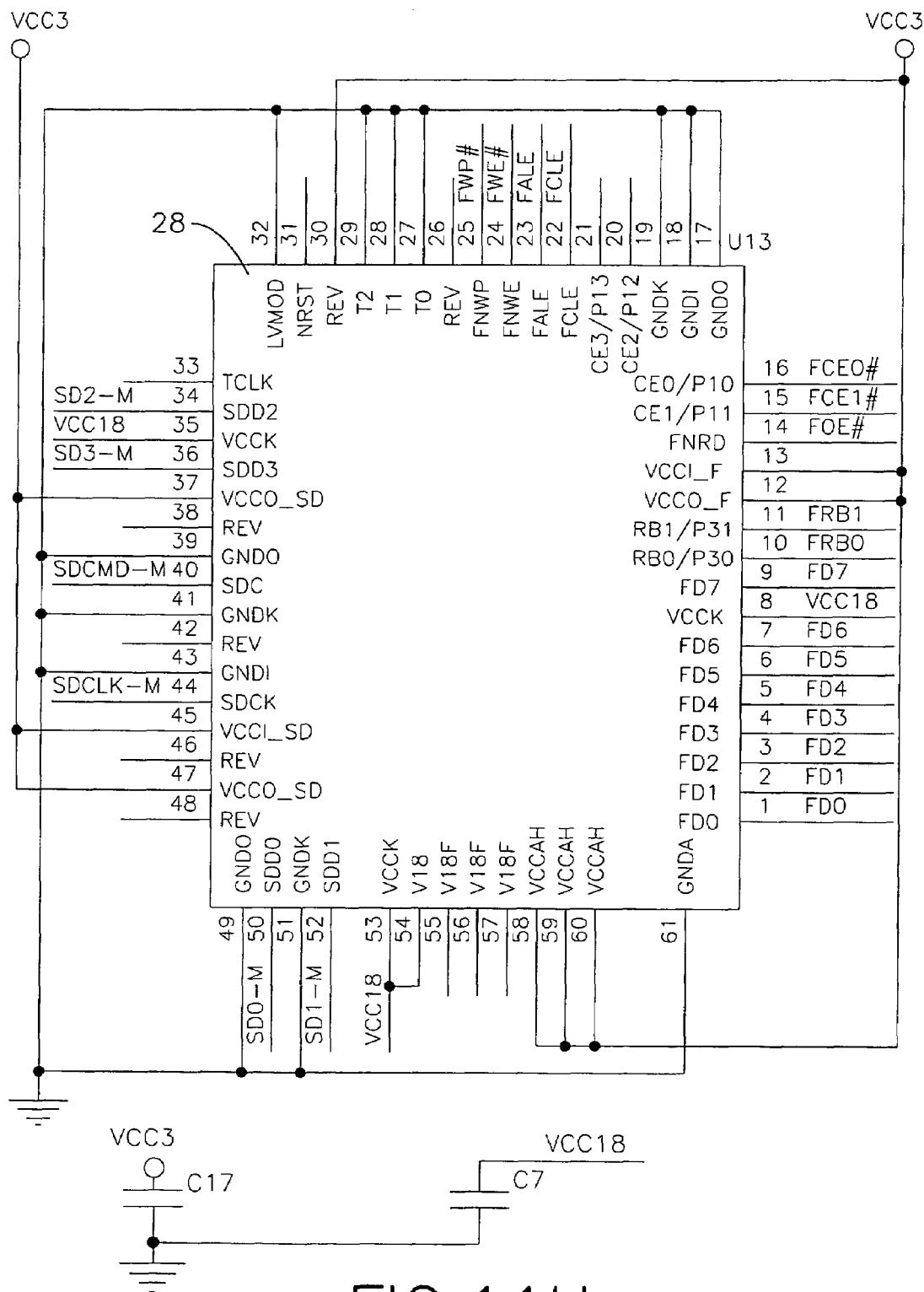
Figure 13:
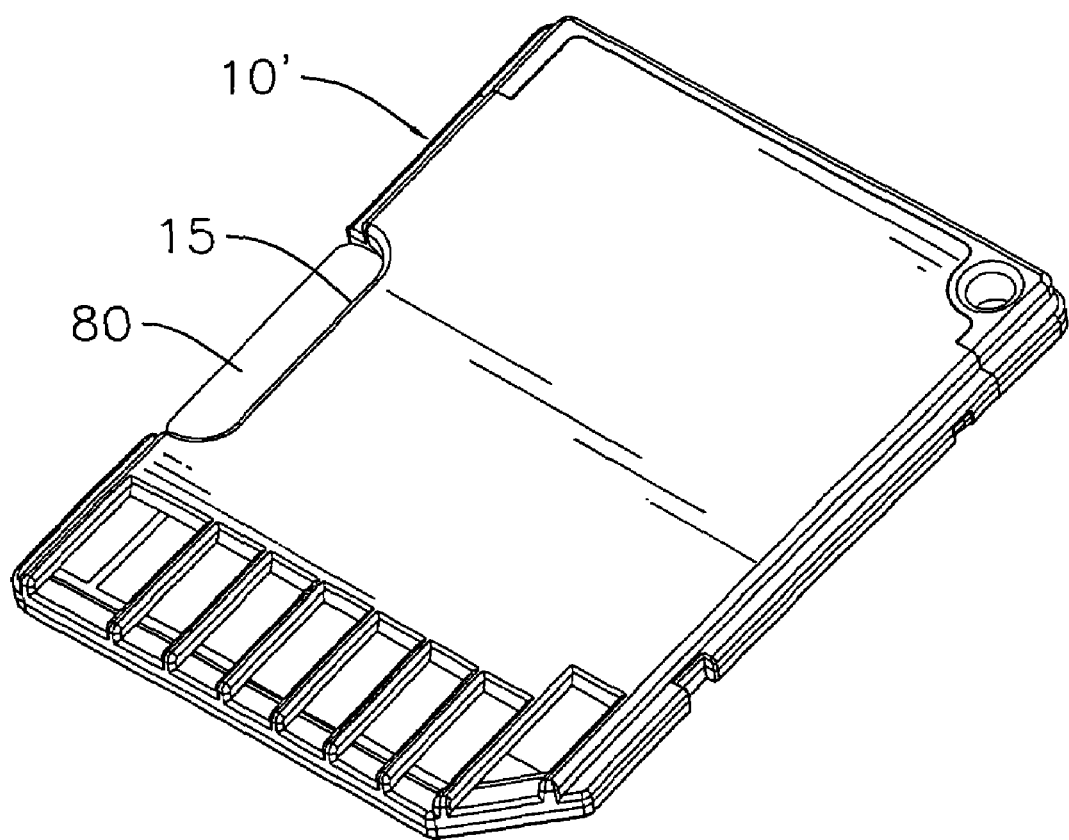
FIG. 13 is a perspective view of the dual-interface converter with a wireless USB interface of a second embodiment in accordance with the present invention.
Figure 14A:
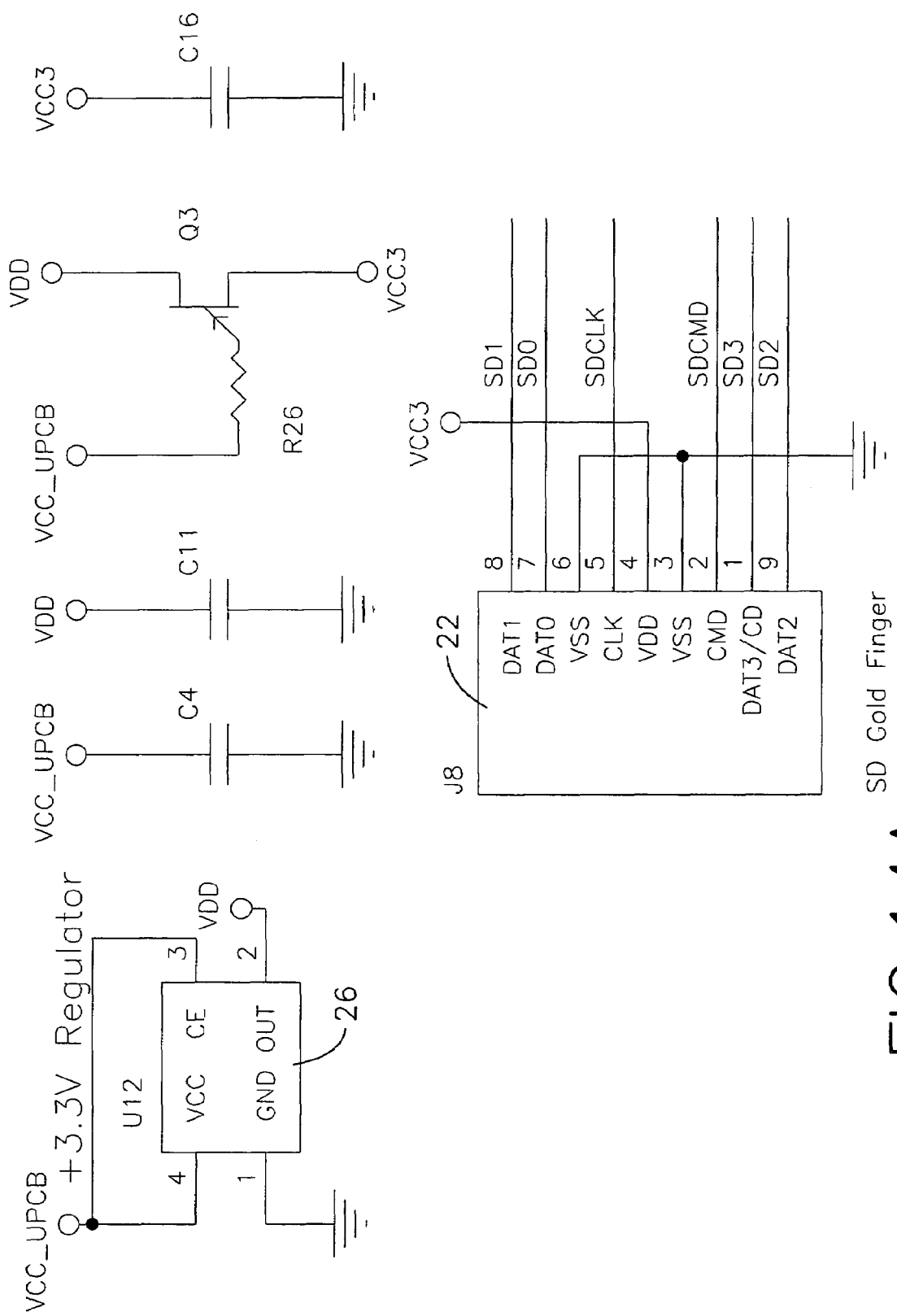
FIG. 14 is a circuit diagram of a dual-interface converter with a wireless RFID interface in accordance with the present invention.
Figure 14B:
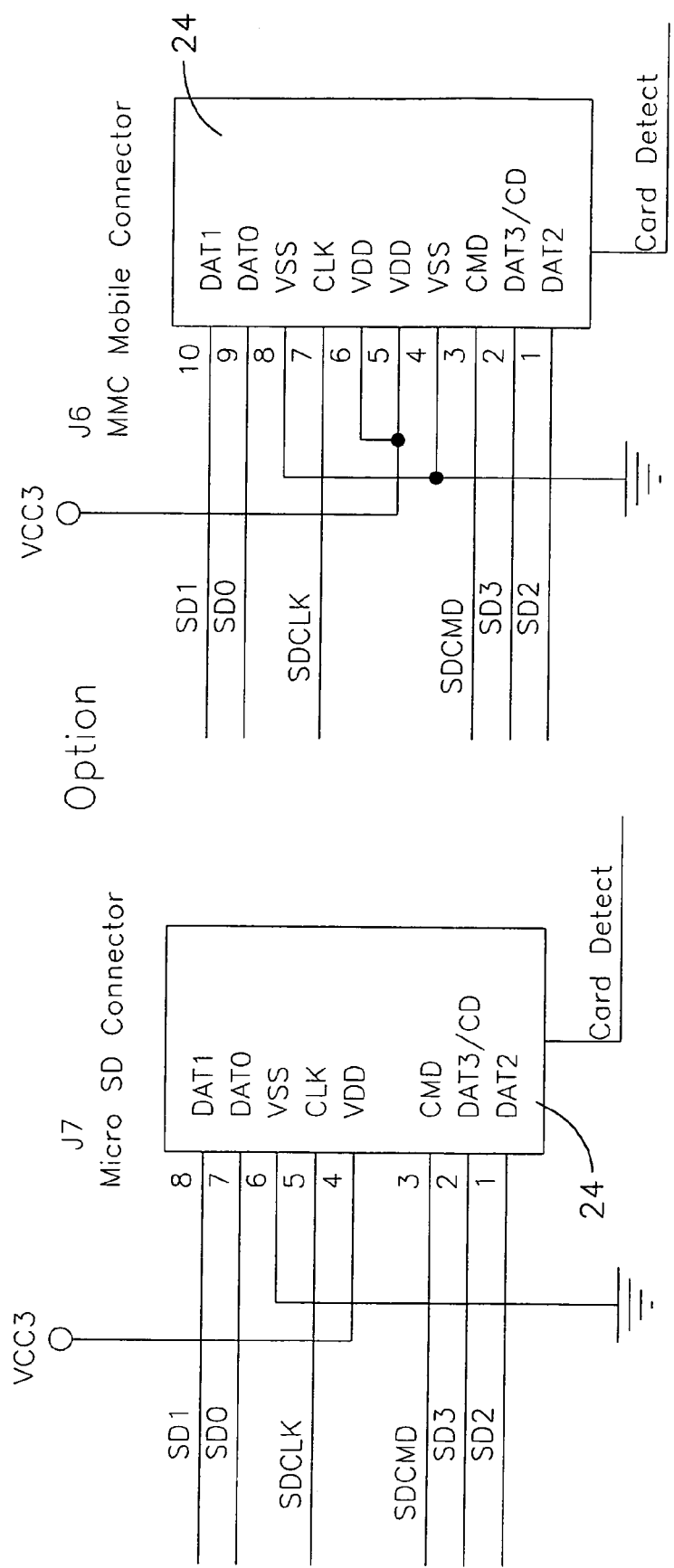
Figure 14C:
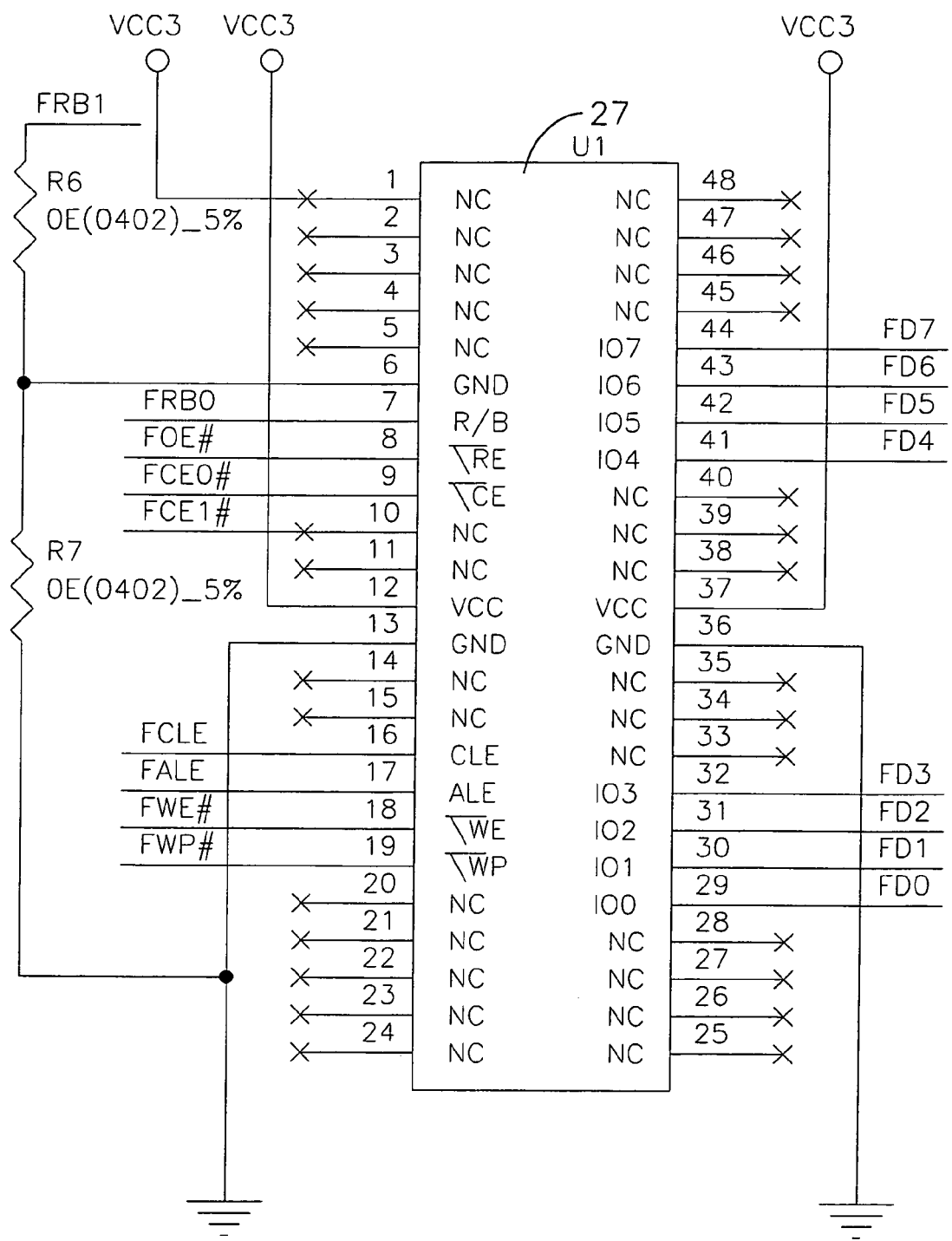
Figure 14D:
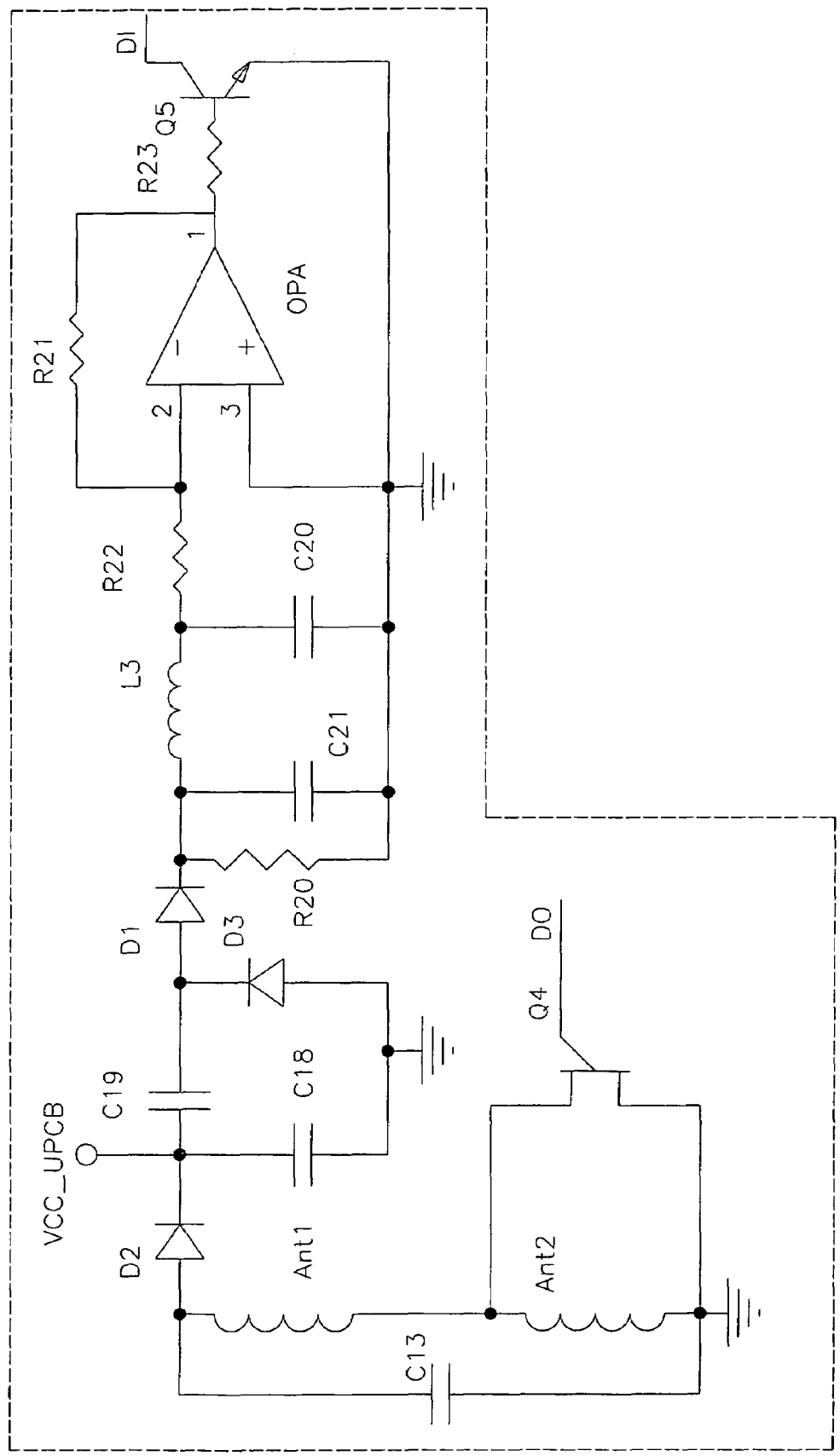
Figure 14E:
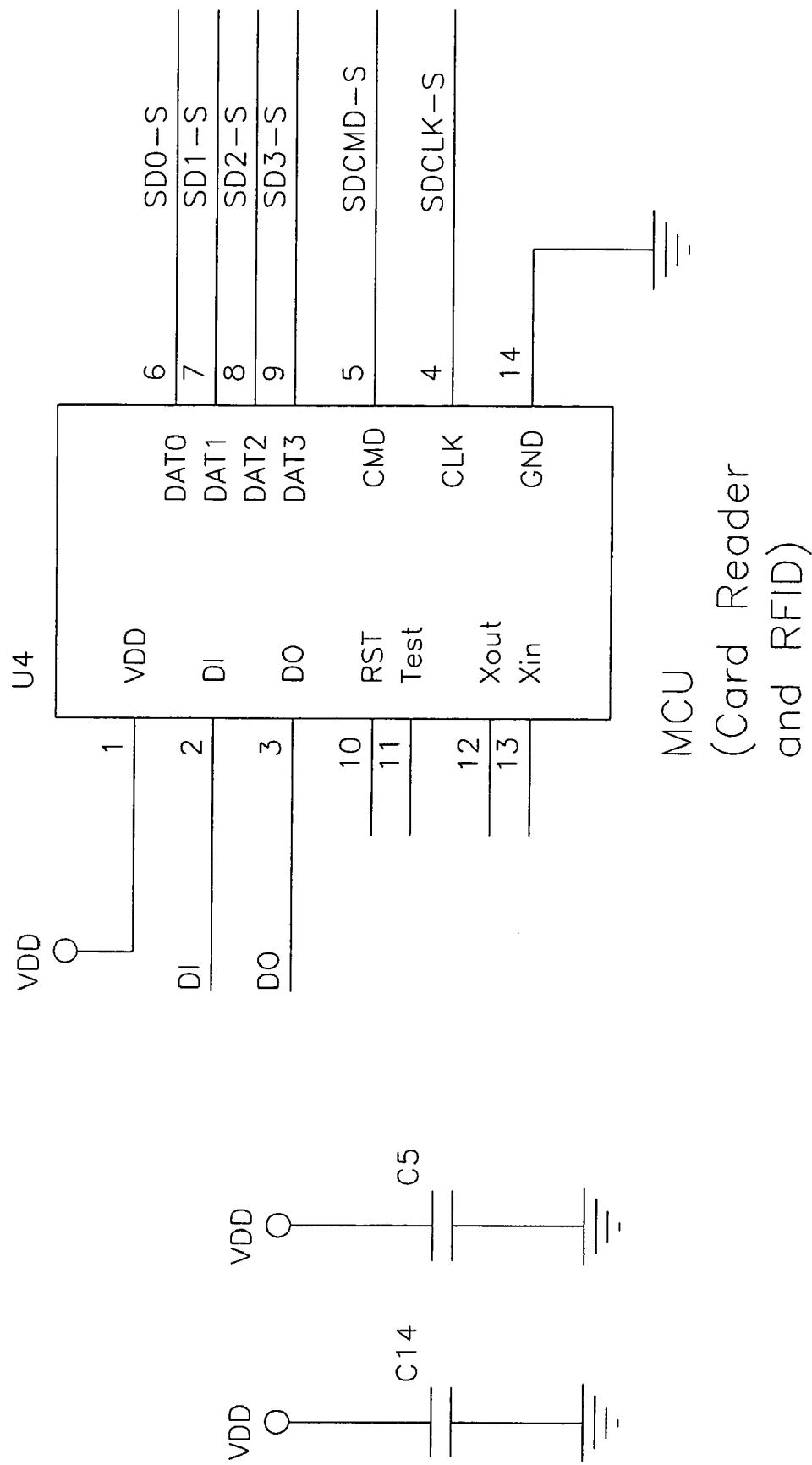
Figure 14F:
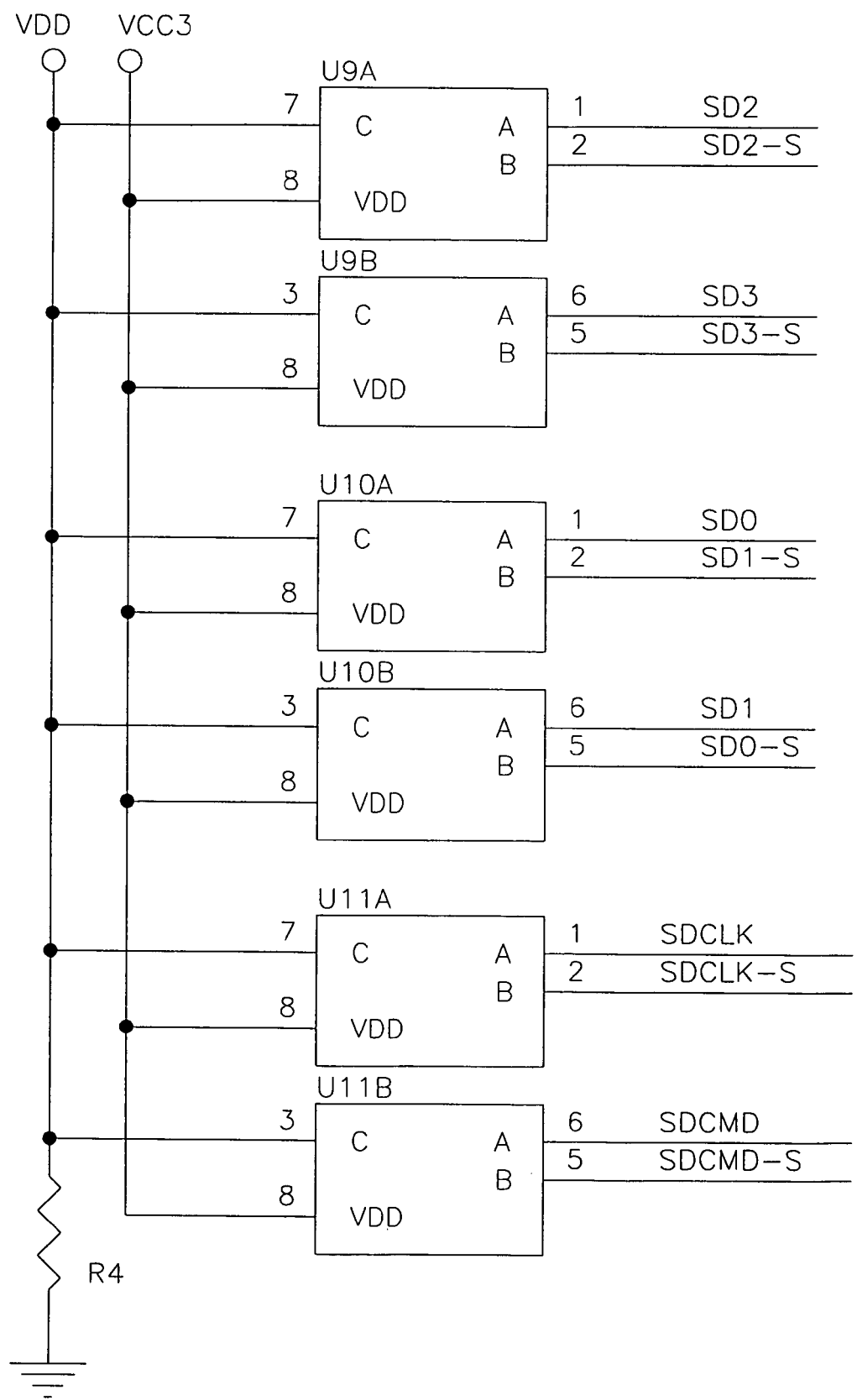
Figure 14G:
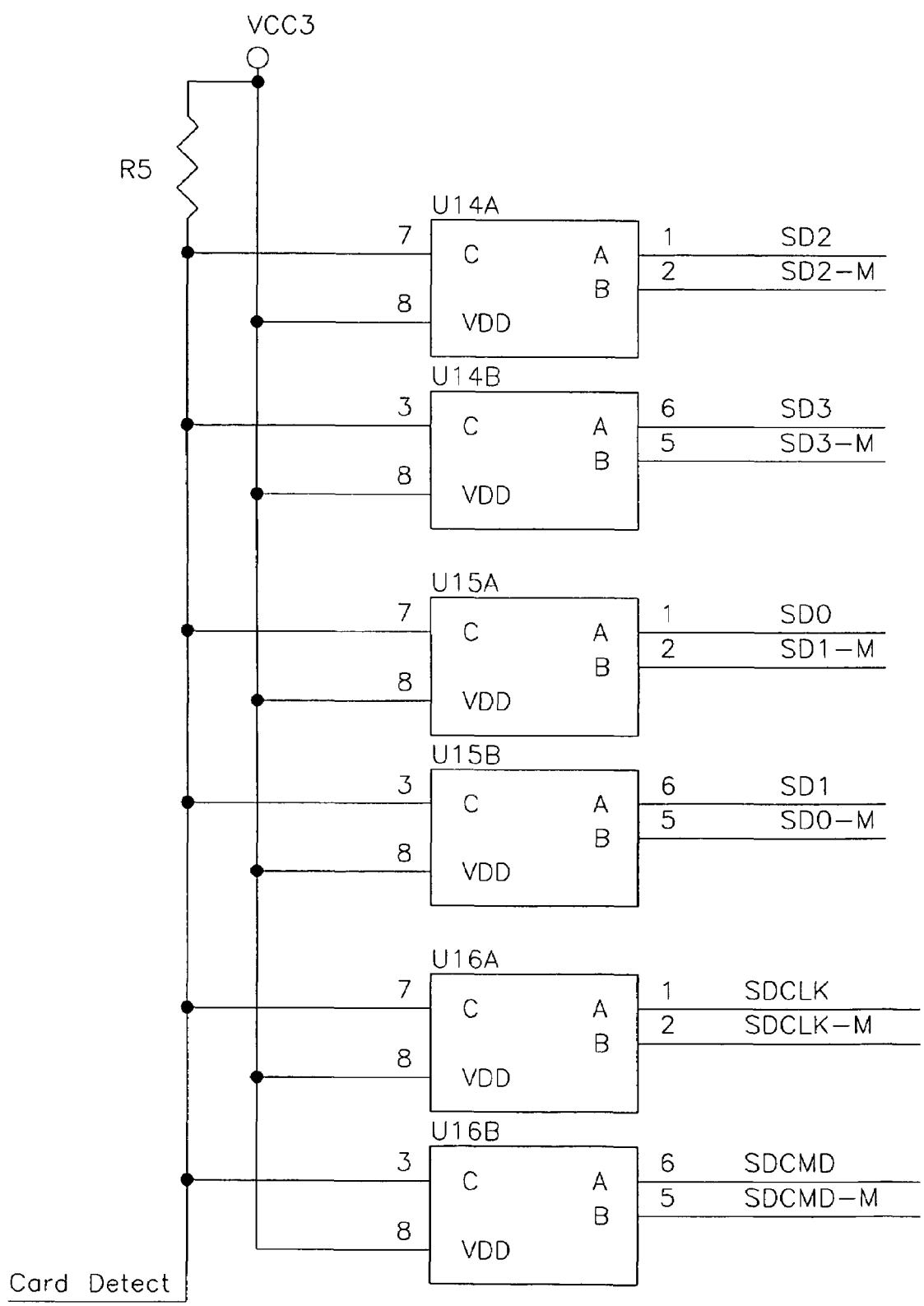
Figure 14H:
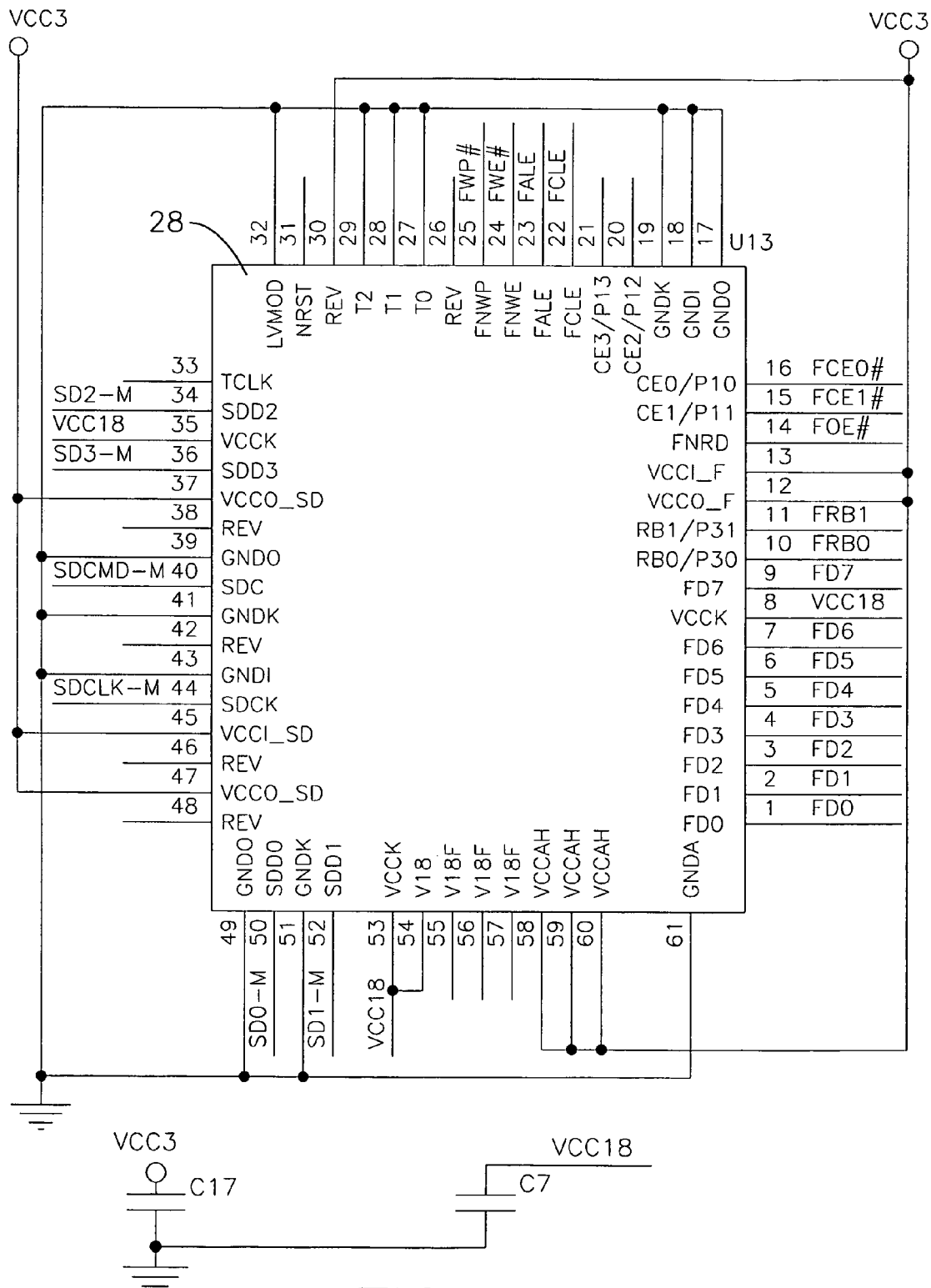
Figure 15:
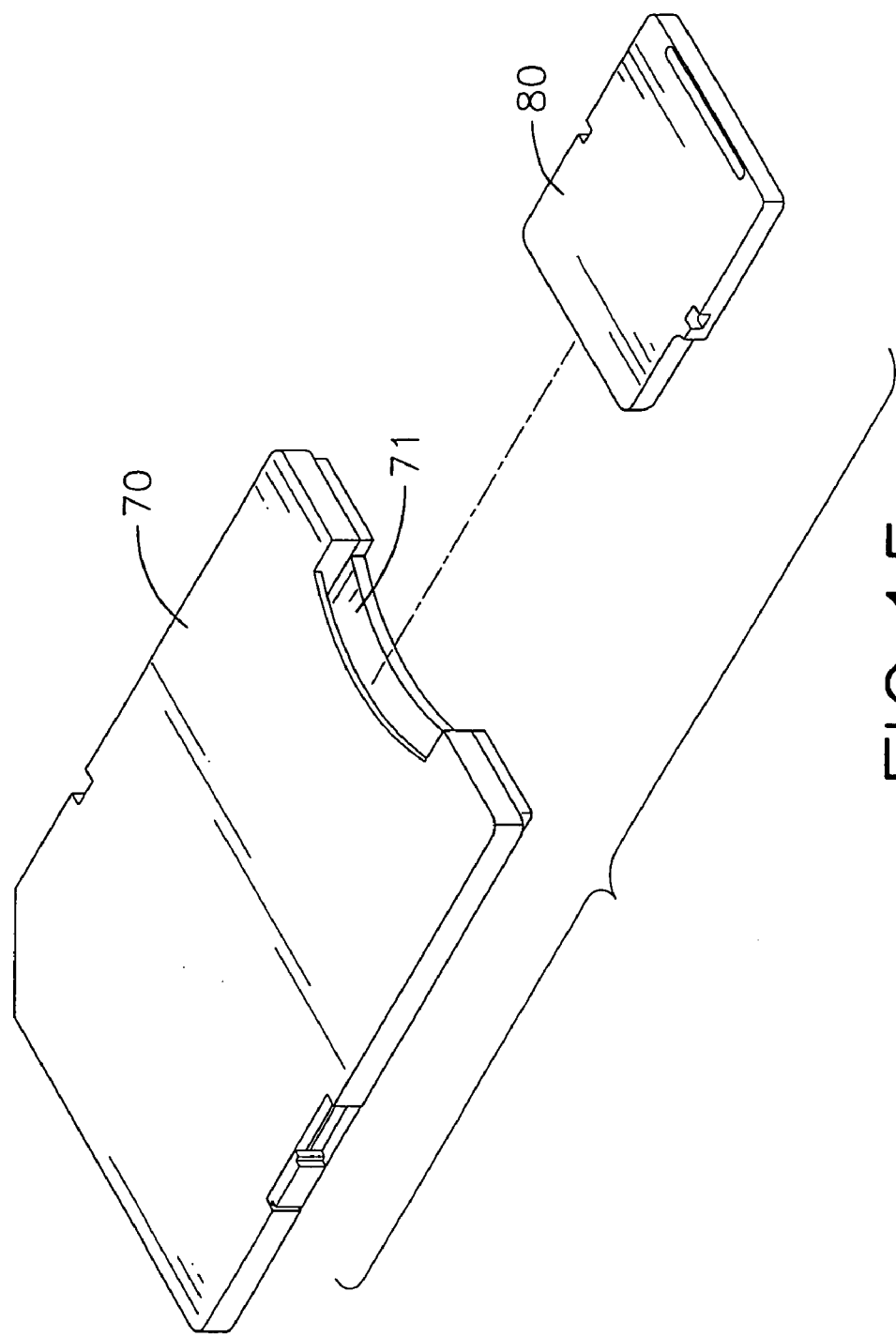
FIG. 15 is an exploded perspective view of a conventional memory card assembly including a memory card and a converting cartridge.
Figure 16:
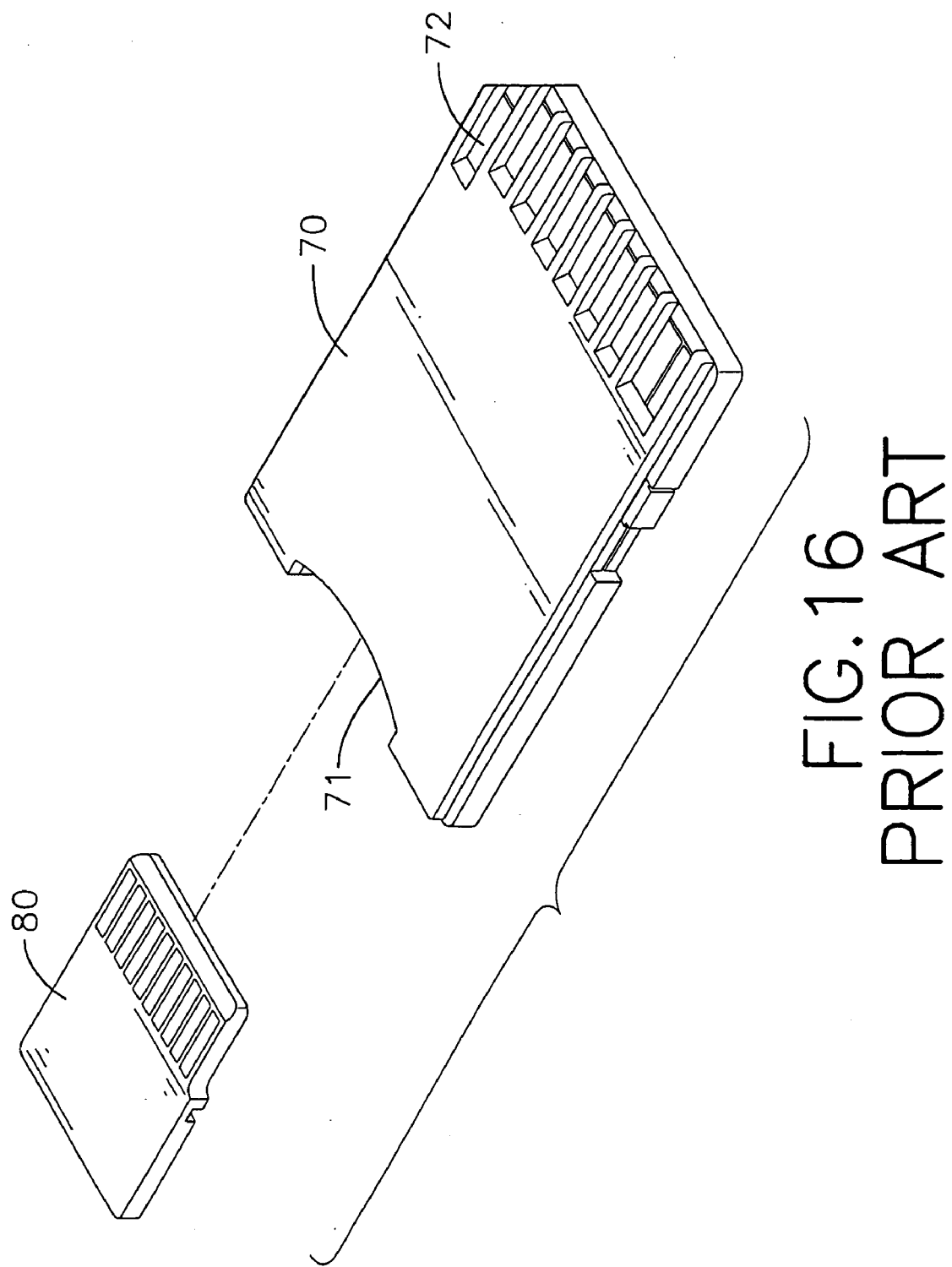
FIG. 16 is another exploded perspective view of the conventional memory card assembly of FIG. 15.

With reference to FIG. 12, although the original USB interface has been replaced by a wireless USB interface, the auxiliary circuit board (23') remains on the housing (10). Data pins on the auxiliary circuit board (23') are removed and only power pins (231) are kept to conduct operating voltage from the USB port of an electronic device to the converting module (20) in the housing (10). With reference to FIG. 13, in the situation that the converter has incorporated with the internal operating voltage, the auxiliary circuit board (23') is not necessary. The shape of the housing (10') of the converter meets the standards of a memory card.

With reference to FIG. 14, another kind of the wireless communicating standards is used. The embodiment uses the RFID communicating technique to achieve wireless data transmission. An RFID controller is incorporated with the card-reading control circuit (25"). A data input pin (DI) and a data output pin (DO) of the card-reading control circuit (25") are connected to a transmitting/receiving circuit (253). Since the electromagnetic induction effect can generate the operating voltage, the converter does not need the auxiliary circuit board.

Other wireless communicating technologies such as Bluetooth or Wireless LAN are also practicable for the converter, not limited to the foregoing wireless USB and RFID standards.

In conclusion, since the miniature memory card can be held by the cartridge with the shape of a standard memory card, any compatible card reader or the electronic product with the memory card slot can utilize the miniature memory card through the converter. In situation where no compatible card reader exists, the electronic device still can read or write data in the miniature memory card by connecting the product interface such as the USB or IEEE 1394 interfaces of the converter to a correspond data transmission port in the electronic device. In addition to the wired data transmitting protocol, the product interface can be a wireless communicating interface, for example the Bluetooth, wireless LAN or wireless USB.

Further, an optional memory module and a memory card control circuit can be formed in the converter, whereby the converter can be used as a removable or a portable data storage media.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A dual-interface converter for a miniature memory card, the converter comprising:
   a cartridge compatible with a standard memory card and comprising:
      a slot defined in the cartridge, wherein the miniature memory card is inserted to the cartridge through the slot;
      a product interface formed on the cartridge for connecting to an electronic device; and
      a standard memory card interface formed on the cartridge;
   a converting module held in the cartridge and connected to the standard memory card interfaceand and the product interface the converting module comprising:
      a main circuit board with connecting wires and a card-reading control circuit;

multiple contacts mounted on the main circuit board to serve as the standard memory card interface and electronically connecting to the connecting wires; and a connector composed of multiple terminals mounted on the main circuit board electronically contacting the miniature memory card held in the cartridge.

2. The dual-interface converter as claimed in claim 1, the card-reading control circuit connecting to the miniature memory card through at least one switch bus that is composed of multiple switching modules, wherein operations of the switching modules are determined by statuses of the product interface.

3. The dual-interface converter as claimed in claim 1, the main circuit board further comprising multiple signal contacts that serve as the product interface and connect to the card-reading control circuit through the connecting wires.

4. The dual-interface converter as claimed in claim 3, wherein the multiple signal contacts are formed on an auxiliary circuit board that electronically connects to the main circuit board.

5. The dual-interface converter as claimed in claim 4, wherein the product interface is a wired communication interface of a Universal Serial Bus (USB) interface or an Institute of Electrical and Electronic Engineers (IEEE) 1394 interface.

6. The dual-interface converter as claimed in claim 1, wherein the converter serves as a portable storage media by forming a memory module and a memory card control circuit on the main circuit board.

7. The dual-interface converter as claimed in claim 6, wherein a switch bus composed of multiple switching modules is connected between the memory card control circuit and the standard memory card interface, and is controlled by a detecting pin of the connector.

8. The dual-interface converter as claimed in claim 1, the card-reading control circuit incorporated with a wireless communication controller.

9. The dual-interface converter as claimed in claim 8, wherein the wireless communication controller is a Radio Frequency Identification (RFID) controller, and the card-reading control circuit uses a data input pin and a data output pin to connect to a transmitting/emitting circuit.

10. The dual-interface converter as claimed in claim 8, wherein the wireless communication controller is a wireless Universal serial Bus (USB) controller, and the card-reading control circuit is connected to an antenna through a Radio Frequency (RF) matching circuit.

11. The dual-interface converter as claimed in claim 1, the cartridge comprising a housing on which the standard memory card interface and the product interface are formed at opposite positions.

12. The dual-interface converter as claimed in claim 11, the housing having:
a first side;
a second side opposite to the first side; and
an opening defined in the second side, wherein the standard memory card interface is formed at the first side and the product interface is pivotally mounted in the opening to be turned inside or outside the opening.

13. The dual-interface converter as claimed in claim 11, the housing having:
a first side;
a second side opposite to the first side; and
a space defined on the second side, wherein the standard memory card interface is formed at the first side and the product interface is movably mounted in the space to be drawn out from the housing or pushed into the housing.

14. The dual-interface converter as claimed in claim 11, the housing having:
a first side;
a second side opposite to the first side; and
a recess defined in the housing near the second side, wherein the product interface is pivotally mounted at opposite sides of the recess as a foldable connector.

15. The dual-interface converter as claimed in claim 11, the housing having:
a first side formed with the standard memory card interface;
a second side with a protruding opposite to the first side, wherein the product interface is formed at the protruding;
a third side connected between the first side and the second side; and
the slot defined in the third side for the miniature memory card.

16. The dual-interface converter as claimed in claim 11, wherein the standard memory card interface and the product interface are formed on the same surface of the housing.

17. The dual-interface converter as claimed in claim 11, wherein the standard memory card interface and the product interface are respectively formed on opposite surfaces of the housing.

18. The dual-interface converter as claimed in claim 5, wherein
the card-reading control circuit incorporates a wireless communication controller; and
the housing has:
a first side formed with the standard memory card interface;
a second side with a protruding opposite to the first side; and
a circuit board compatible with the wired communication interface mounted on the protruding and having power pins formed on the circuit board.

19. The dual-interface converter as claimed in claim 8, wherein the converter serves as a portable storage media by forming a memory module and a memory card control circuit on the main circuit board.

20. The dual-interface converter as claimed in claim 15, the cartridge comprising a protect cover attached to the protruding.

21. The dual-interface converter as claimed in claim 20, wherein the protect cover comprises:
a U-shaped body having a width coffesponding to a width of the housing;
a groove defined in the U-shaped body and facing the protruding of the second side of the housing, wherein the protruding of the second side is inserted into the groove to attach to the protect cover; and
a metal plate attached to one side of the U-shaped body.

22. The dual-interface converter as claimed in claim 1, wherein the miniature memory card is a Micro Secure Digital (SD), a Multi-Media card (MMC) Micro or Memory Stick Micro (M2) memory card.

23. The dual-interface converter as claimed in claim 1, wherein the standard memory card is a standard Secure Digital (SD) memory card, an Multi-Media card (MMC), an Memory Stick (MS) memory card or a Memory Stick (MS) Duo memory card.

* * * * *